(12) United States Patent
Reimer

(10) Patent No.: US 11,595,223 B2
(45) Date of Patent: *Feb. 28, 2023

(54) AUTOMATED METHODS AND APPARATUS FOR FACILITATING THE DESIGN AND DEPLOYMENT OF MONITORING SYSTEMS

(71) Applicant: Charter Communications Operating, LLC, St. Louis, MO (US)

(72) Inventor: Mark Reimer, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/108,902

(22) Filed: Dec. 1, 2020

(65) Prior Publication Data
US 2021/0083893 A1 Mar. 18, 2021

Related U.S. Application Data

(63) Continuation of application No. 15/694,753, filed on Sep. 1, 2017, now Pat. No. 10,855,482.

(51) Int. Cl.
*H04L 12/28* (2006.01)
*G08B 29/20* (2006.01)
(Continued)

(52) U.S. Cl.
CPC .......... *H04L 12/2807* (2013.01); *G06F 16/29* (2019.01); *G08B 19/005* (2013.01);
(Continued)

(58) Field of Classification Search
CPC .... G06F 17/5004; G06F 17/509; G06F 16/29; G06F 17/5086; G06F 2217/02;
(Continued)

(56) References Cited

U.S. PATENT DOCUMENTS 7,378,942 B2 * 5/2008 Seeley .................... G06F 30/13
340/8.1
8,482,609 B1 * 7/2013 Mishra ............... G08B 13/1968
348/143

(Continued)

*Primary Examiner* — David R Lazaro
(74) *Attorney, Agent, or Firm* — Straub & Straub; Michael P. Straub; Stephen T. Straub

(57) ABSTRACT

Methods and apparatus for automating various aspects relating to the design and/or deployment of monitoring systems, e.g., systems which can monitor for fire, break-ins and/or other conditions are described. In various embodiments a customer provides location and customer premises layout information as well as an indication of what is to be monitored. A rules database is accessed and a plan that is compliant with local rules is automatically generated. A user is walked through deployment of components, e.g., on his cell phone or other handheld communications device, in an easy to follow manner with monitoring device position, wireless communications ability, and function being checked automatically as part of the process as each sensor is deployed. If wireless connectivity is a problem suggestions are presented to the user for moving a sensor, e.g., camera. At the end of the process the system is activated and monitoring of the premises initiated.

20 Claims, 19 Drawing Sheets

(51) Int. Cl.
   *G08B 29/18* (2006.01)
   *G06F 16/29* (2019.01)
   *G08B 19/00* (2006.01)

(52) U.S. Cl.
   CPC ........... *G08B 29/18* (2013.01); *G08B 29/185* (2013.01); *G08B 29/20* (2013.01)

(58) Field of Classification Search
   CPC .... H04N 7/181; H04N 5/247; G06Q 30/0201; G06Q 10/06; G06Q 10/10; G06Q 30/02; G06Q 30/0603; G06Q 50/08; G08B 13/19645; G08B 13/1968; G08B 13/19613; G08B 13/19634; G08B 13/19639; G08B 13/19641; G08B 13/19652; G08B 13/19682; G08B 13/19697; G08B 19/005; G08B 21/02; G08B 29/12; G08B 29/18; G08B 29/185; G08B 29/20; H04L 12/2807
   See application file for complete search history.

(56) References Cited

U.S. PATENT DOCUMENTS

| | | | | |
|---|---|---|---|---|
| 8,817,102 B2* | 8/2014 | Saeki | ................. | G08B 13/1968 348/154 |
| 8,934,017 B2* | 1/2015 | Chen | ................. | H04N 7/181 348/159 |
| 9,619,992 B2* | 4/2017 | Addy | ................. | G08B 25/003 |
| 9,898,921 B2* | 2/2018 | Shapiro | ................. | G08B 29/12 |
| 10,073,929 B2* | 9/2018 | Vaynriber | ................. | G06F 30/18 |
| 10,306,185 B2* | 5/2019 | Cho | ................. | H04N 7/181 |
| 10,855,482 B2* | 12/2020 | Reimer | ................. | G08B 19/005 |
| 2004/0068478 A1* | 4/2004 | Stubbs | ................. | G06F 16/78 |
| 2005/0038636 A1* | 2/2005 | Wakelam | ................. | G06F 30/17 703/1 |
| 2007/0096902 A1* | 5/2007 | Seeley | ................. | G06Q 10/10 340/539.2 |
| 2007/0250695 A1* | 10/2007 | Philyaw | ................. | H04L 41/0886 713/1 |
| 2007/0282665 A1* | 12/2007 | Buehler | ................. | G08B 13/19697 705/7.29 |
| 2008/0284848 A1* | 11/2008 | Martin | ................. | F41H 11/02 348/143 |
| 2011/0196755 A1* | 8/2011 | Landa | ................. | G07G 1/0009 717/176 |
| 2011/0317016 A1* | 12/2011 | Saeki | ................. | H04N 5/247 348/154 |
| 2012/0078833 A1* | 3/2012 | Johnson | ................. | G06N 5/025 706/47 |
| 2012/0147181 A1* | 6/2012 | Duner | ................. | G03B 17/02 348/143 |
| 2019/0074990 A1* | 3/2019 | Reimer | ................. | G08B 29/185 |
| 2021/0083893 A1* | 3/2021 | Reimer | ................. | G08B 29/18 |

* cited by examiner

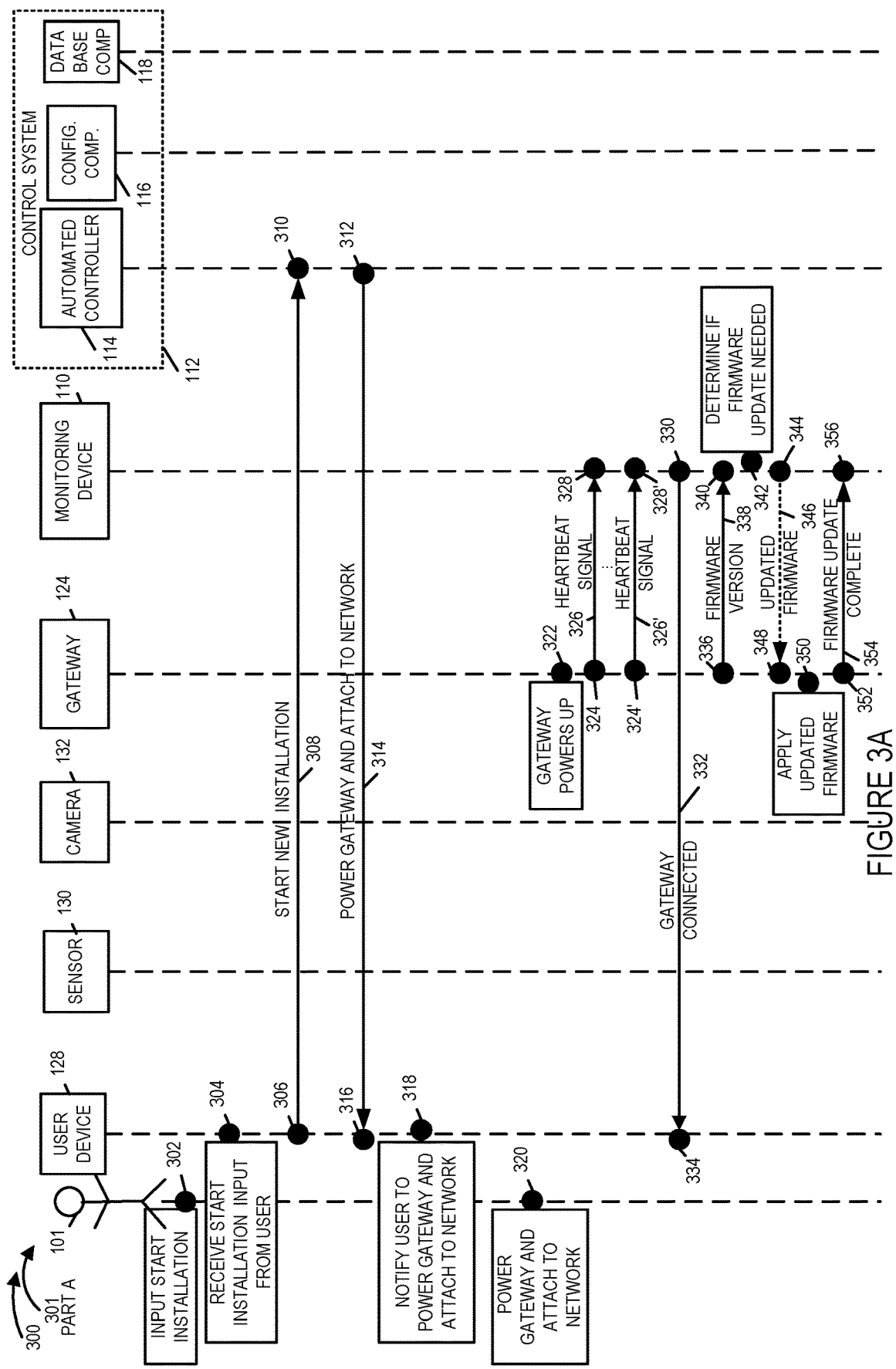

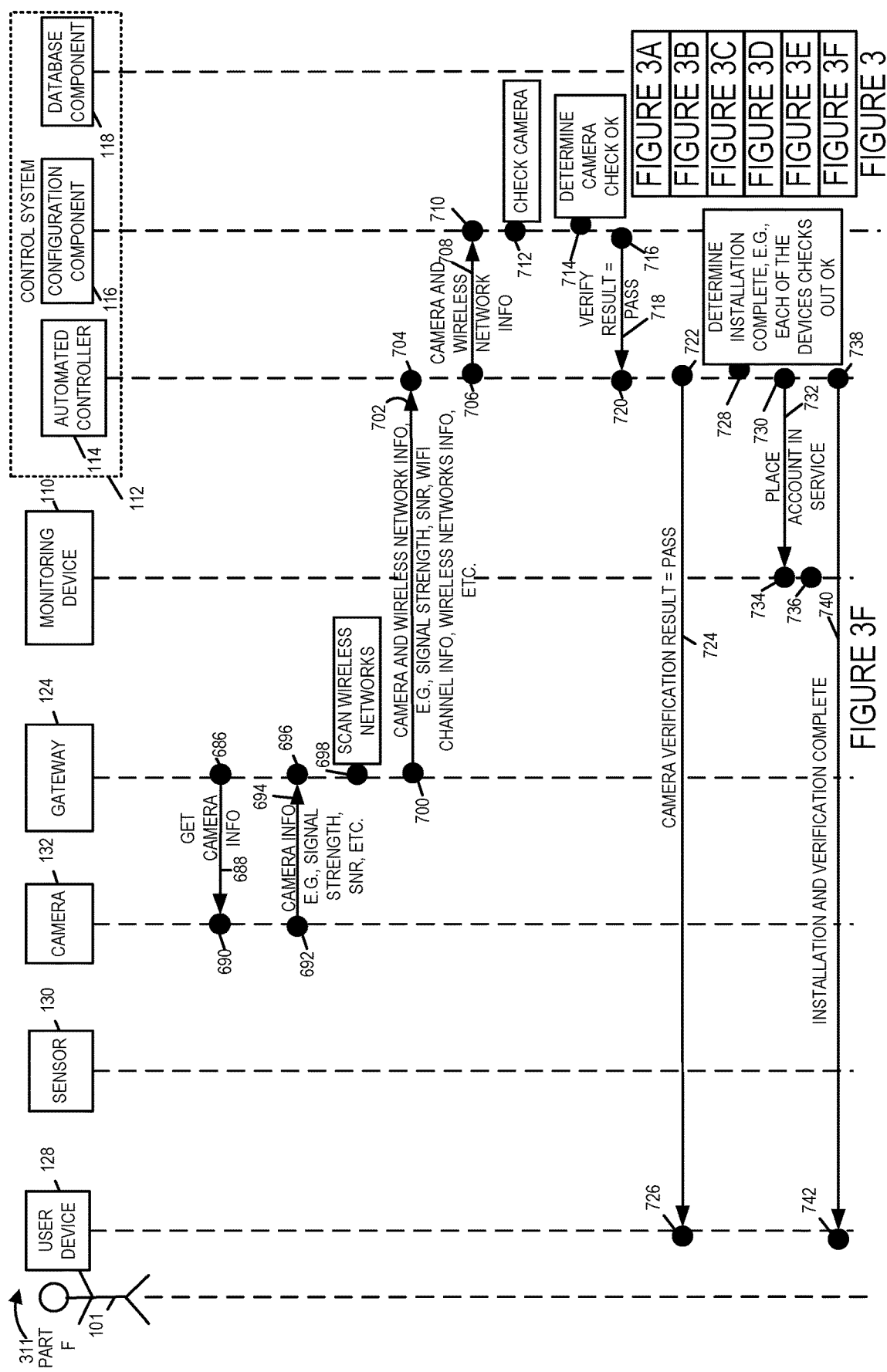

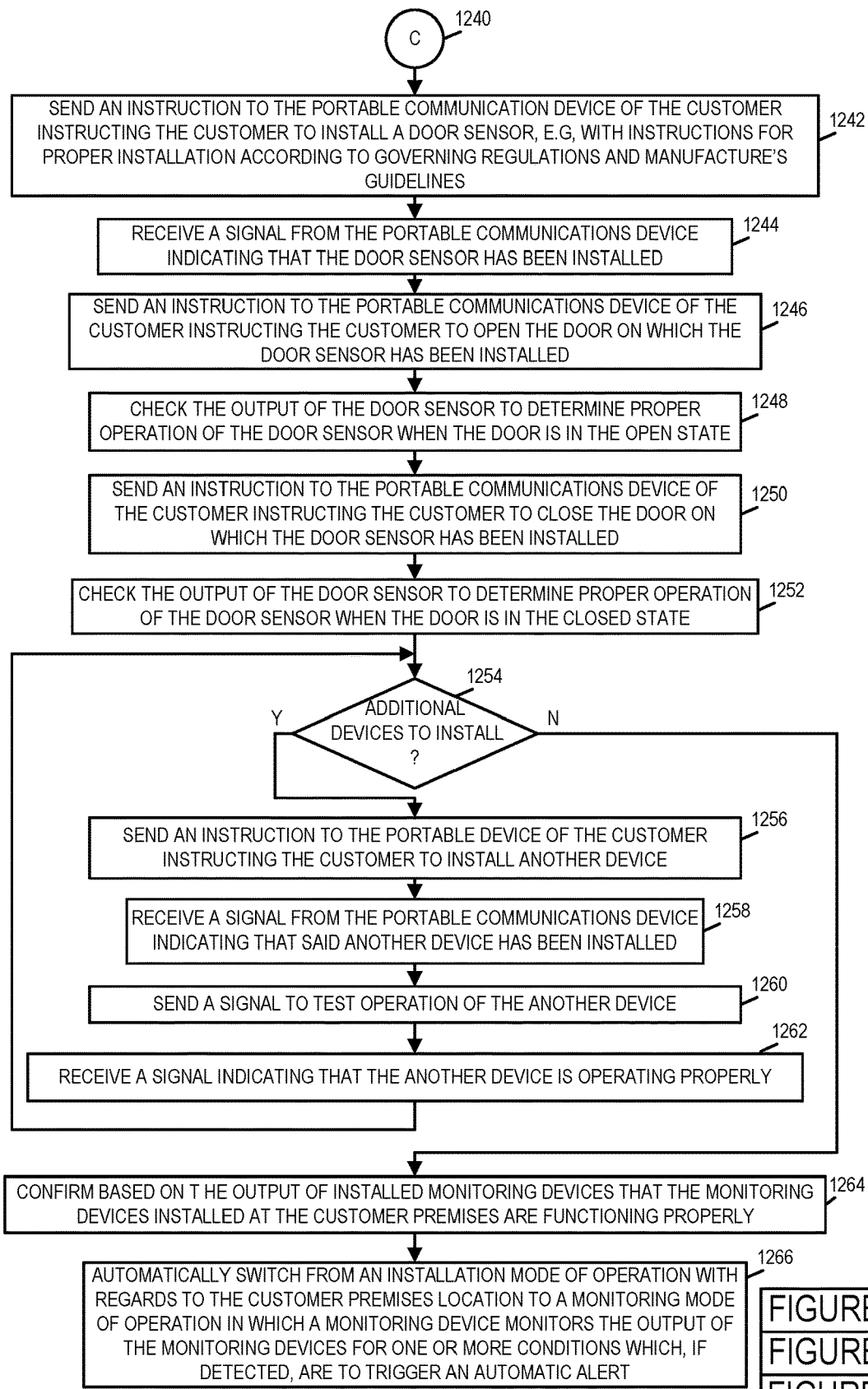

| FIGURE 9A | FIGURE 9B | FIGURE 9C |

AUTOMATED METHODS AND APPARATUS FOR FACILITATING THE DESIGN AND DEPLOYMENT OF MONITORING SYSTEMS

RELATED APPLICATIONS

The present application is a continuation of U.S. patent application Ser. No. 15/694,753 filed on Sep. 1, 2017, which published on Mar. 7, 2019 as US patent Publication No. 2019/0074990 A1, is hereby expressly incorporated by reference in its entirety.

FIELD

The present application relates to monitoring systems and more particularly to methods and apparatus for automating various aspects relating to the design and/or deployment of monitoring systems, e.g., systems which can monitor for fire, break-ins and/or other conditions.

BACKGROUND

There are numerous rules, in the forms of codes, standards, manufacturer's specifications, and regulations for authorities having jurisdiction that must be followed when designing and installing a security alarm system. This information, e.g., rule information, changes frequently, like tax law, and varies by jurisdiction which is normally based on location of the premises to be monitored. It is difficult for a person to retain all of this information and requires considerable training and continuous education.

Accordingly, designing a security and/or other type of monitoring system for a premises is difficult and, in many states, often involves a licensed professional to conduct a visual inspection of the premises with the customer in order to create a custom design to detect an intruder in every case, while ignoring normal household behavior. There are numerous codes, and standards that must be followed. Improper installation or failure to meet the codes and standards may result in inconveniences such as false alarms and fines from police departments, up to major compromises in life safety in the case of an improperly installed fire or CO detector.

The security alarm industry has recognized this problem and is addressing it through rigorous training and continuous education; however, the quality of the design and installation of security systems still widely varies. Furthermore, even the best security system design, created by a qualified field sales specialist, is likely to be improperly installed because systems for transferring this information lack sufficient detail for the person performing the installation. This leads to wasted time and customer frustration.

Once designed, there is often a problem with communicating the design and installation requirement of a security or other monitoring system to the person who will perform the installation in a way that is easy to understand and will likely result in proper deployment and/or positioning of various system components during the installation process. Important information is often lost in communication to the installer, premises may differ from what is on a design, the names of the rooms on the plan may be different from what the installer expects, and/or the communicated, e.g., printed, plan may lack the level of detail needed for the installer. As a result the design of the security system has to be repeated/revised by the installer who may lack the knowledge of the rules/applicable codes and/or the monitoring system may be installed improperly increasing the risk of fines due to non-compliance with rules and/or giving a false sense of security. In addition, some components, e.g., wireless cameras and/or sensors, even when installed according to a plan may suffer from unexpected problems due to wireless signal interference or poor WiFi in a particular location.

In view of the above it should be appreciated that there is a need for methods and apparatus which could be used to automate portions of the design of a monitoring system to ensure compliance with rules and requirement for a particular location where the system is to be deployed. There is also a need for improved methods of communicating to an installer component and/or other monitoring system information to ensure that the system components are deployed in a way that increases the chances of the component(s) functioning as intended and being in locations required by applicable rules. In addition there is a need for testing components as they are deployed and/or making suggestions for changes to improve their function if wireless communications or other problems exist even when a monitoring device, e.g., camera, is positioned as originally planned. It should be appreciated that it would be desirable if an automated system could be developed which could address one or more of the above problems and/or reduce the need for skilled system designing to be actively involved with the field deployment of a monitoring system.

SUMMARY

Various embodiments are directed to methods and apparatus for automating various aspects relating to the design and/or deployment of monitoring systems, e.g., systems which can monitor for fire, break-ins and/or other conditions are described. In various embodiments a customer provides location and customer premises layout information as well as an indication of what is to be monitored. A rules database is accessed and a plan that is compliant with local rules is automatically generated. A user is walked through deployment of components, e.g., on his cell phone or other handheld communications device, in an easy to follow manner with monitoring device position, wireless communications ability, and function being checked automatically as part of the process as each sensor is deployed. If wireless connectivity is a problem suggestions are presented to the user for moving a sensor, e.g., camera. At the end of the process the system is activated and monitoring of the premises initiated.

By automating many of the aspects of the design of the monitoring system the need to a skilled designer is reduced or avoided. By walking the installer through the deployment process in an automated interactive manner in which the installer deploys system components, the communications capability of the deployed component is checked and then the function of the deployed monitoring checked, a high degree of reliability can be achieved with regard to the deployment and reliability, e.g., in terms of both wireless communication functionality and sensor operability can be achieved without the need for a skilled installer. Furthermore as problems are detected during the deployment process, automated suggestions for addressing the problems can and are provided, e.g., to the users wireless communications device such as a cell phone used to provide instructions to the installer and to receive installer input. For example, if a communications problem with a wireless camera or smoke detector is detected, the installer may be instructed to try another position which remains compliant with government position regulations but which provides improved communications for the sensor allowing for more reliable communication of information back to a central monitoring system.

By automating many of the aspects of designing a monitoring system and adding automated monitoring device communication and function features to a system installation process, a relatively unskilled installer, e.g., homeowner, can achieve design and installation results of a monitoring system on a level which is as good or better than what would be achieved by a professional installation in many cases without the need to rely on a professional installer or designer for the monitoring system.

An exemplary monitoring system deployment and configuration method, in accordance with some embodiments, comprises: receiving at a control system information about a customer premises at which a monitoring system is to be installed and information indicating one or more types of monitoring to be performed at the customer premises; accessing, at the control system, a database of government rule information for a location of the customer premises to determine, based on the location, at least one of: a type of monitoring device required by applicable rules, a location at which a required monitoring device is to be placed at the customer premises, or a number of monitoring devices required to be placed at the customer premises location; generating a monitoring system design based on received customer premises layout information and rule information included in the database; and communicating installation information to a portable communications device corresponding to a customer instructing the customer how to install a first monitoring device at the customer premises in accordance with the generated monitoring system design.

Numerous variations and benefits are possible as will be discussed further in the detailed description which follows.

BRIEF DESCRIPTION OF THE FIGURES

FIG. 2 comprises the combination of FIG. 2A and FIG. 2B.

FIG. 3A illustrates a first part of exemplary installation and activation sequence of a home automation and security system in accordance with an exemplary embodiment.

FIG. 3F illustrates a sixth part of exemplary installation and activation sequence of a home automation and security system in accordance with an exemplary embodiment.

FIG. 3 comprises the combination of FIG. 3A, FIG. 3B, FIG. 3C, FIG. 3D, FIG. 3E and FIG. 3F.

FIG. 8C is a third part of a flowchart of an exemplary method of performing a monitoring system deployment and configuration in accordance with an exemplary embodiment.

FIG. 8 comprises the combination of FIG. 8A, FIG. 8B and FIG. 8C.

DETAILED DESCRIPTION

Figure 1:
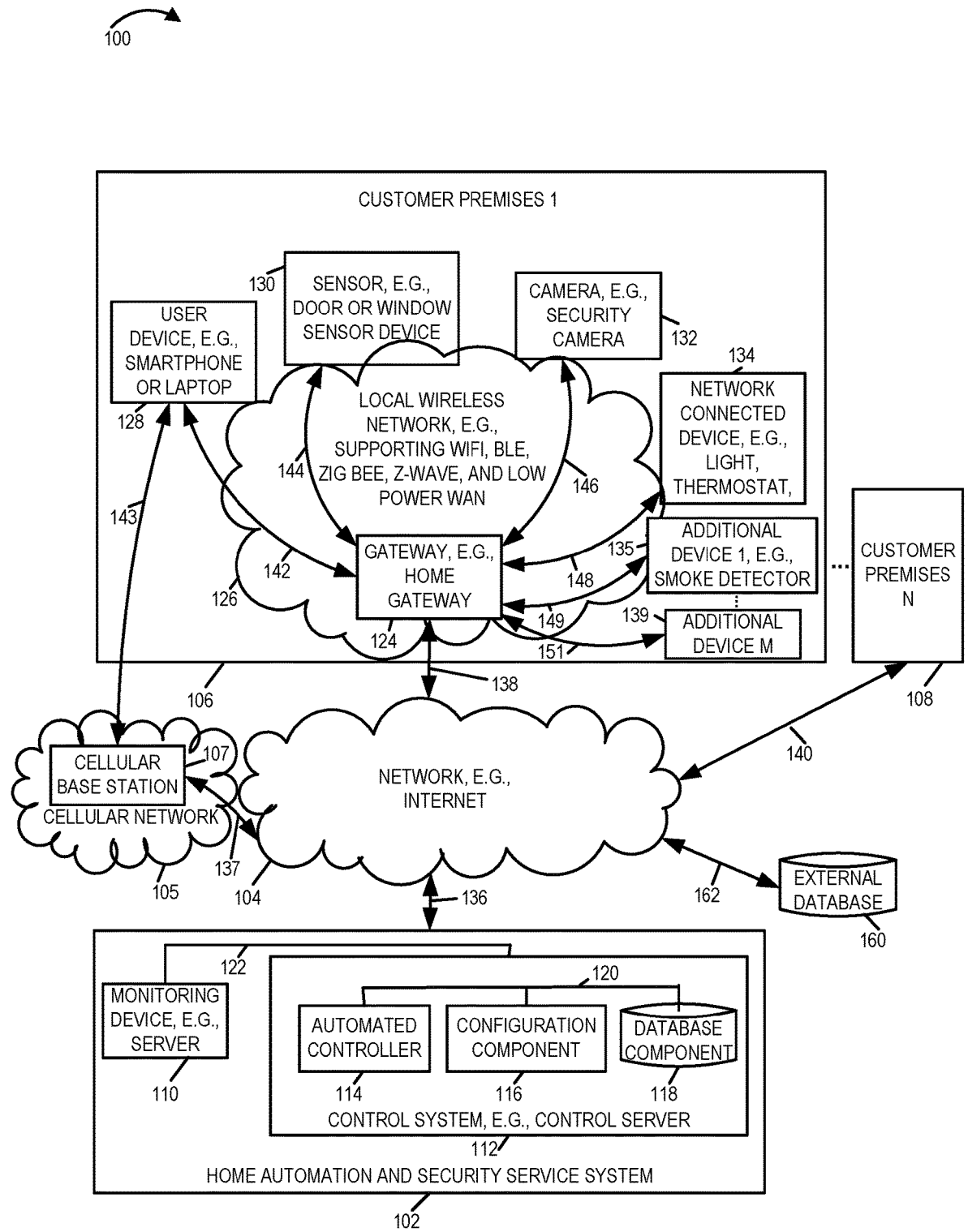
FIG. 1 is a drawing of an exemplary home automation and security system in accordance with an exemplary embodiment.

FIG. 1 is a drawing of an exemplary home automation and security system 100 in accordance with an exemplary embodiment. Home automation and security system 100 includes a home automation and security service system 102, a network 104, e.g., the Internet, a plurality of customer premises (customer premises 1 106, . . . , customer premises N 108), and a cellular network 105.

Home automation and security service system 102 includes a monitoring device 110, e.g., a monitoring server, and a control system 112, e.g., a control server, coupled together via a bus 122. Control system 112 includes an automated controller 114, a configuration component 116, and a database component 118, coupled together via a bus 120. Cellular network 105 includes a cellular base station 107. Customer premises 1 106, e.g., a home or business site, includes a gateway 124, e.g., a home gateway, supports wireless communications over local wireless network 126, e.g., a local wireless network supporting WiFi and Bluetooth Low Energy (BLE). Customer premises 1 106 further includes one or more user devices including user device 128, e.g., a smart phone or laptop, or wireless tablet, a plurality of sensors including sensor 130, e.g., a window sensor, a door sensor, one or more cameras, e.g., security cameras, including camera 132, one or more network connected devices, e.g., controllable light, controllable thermostat, controllable door, controllable appliance, etc., including network connected device 134, and additional devices (additional device 1 135, e.g., a smoke detector, . . . , additional device M 139). Each of the user device 128, sensor 130, camera 132, network connected device 134, additional device 1 135, . . . , additional device M 139, may be, and sometimes is, coupled to the gateway 124, e.g., by a wireless and/or wired connection. In some embodiments, at least one device in the set of devices (128, 130, 132, 134, 135, . . . , 139) includes a different set of communications interfaces and/or support a different set of communications protocols than another device in the set of devices (128, 130, 132, 134, 135, . . . , 139). For example, in one exemplary embodiment user device 128 may support cellular communications, BLE and WiFi, while one or more of the sensor 130, camera 132 and network connected device 134 may only support one of: BLE, ZigBee, Z-Wave, low power WAN, or WiFi. For example, in one such exemplary embodiment, sensor 130 may support ZigBee and camera 132 may support WiFi. In other embodiments, the devices may support different sets of communications interfaces and/or communications protocols. In some embodiments, some of the devices (128, 130, 132, 134, 135, . . . , 139) support wired communications and gateway 124 supports wired local network communications.

User device 128, e.g., a smart phone, is coupled to gateway 124, via wireless link 142. User device 128 may be, and sometimes is, coupled to base station 107 of cellular network 105 via wireless link 143. Sensor 130 is coupled to gateway 124 via wireless link 144. Camera 132 is coupled to gateway 124 via wireless link 146. Network connected device 134 is coupled to gateway 124 via wireless link 148. Additional device 1 135, e.g., a smoke detector, is coupled to gateway 124 via wireless link 149. Additional device M 139 is coupled to gateway 124 via a wired or wireless link 151.

Gateway 124 is coupled to network 104 via communications link 138. The gateway included in customer premises N 108 is coupled to network 104 via communications link 140. Network 104 is coupled to home automation and security service system 102 via communications link 136. Cellular base station 107 is coupled to network 104 via communications link 137.

In some embodiments, system 100 further includes an external database 160 coupled to network 104 via link 162. In some embodiments, control system 112 accesses external database 160. In some embodiments, portions of the external database 160 are transferred, e.g., copied into database component 118.

Figure 2A:
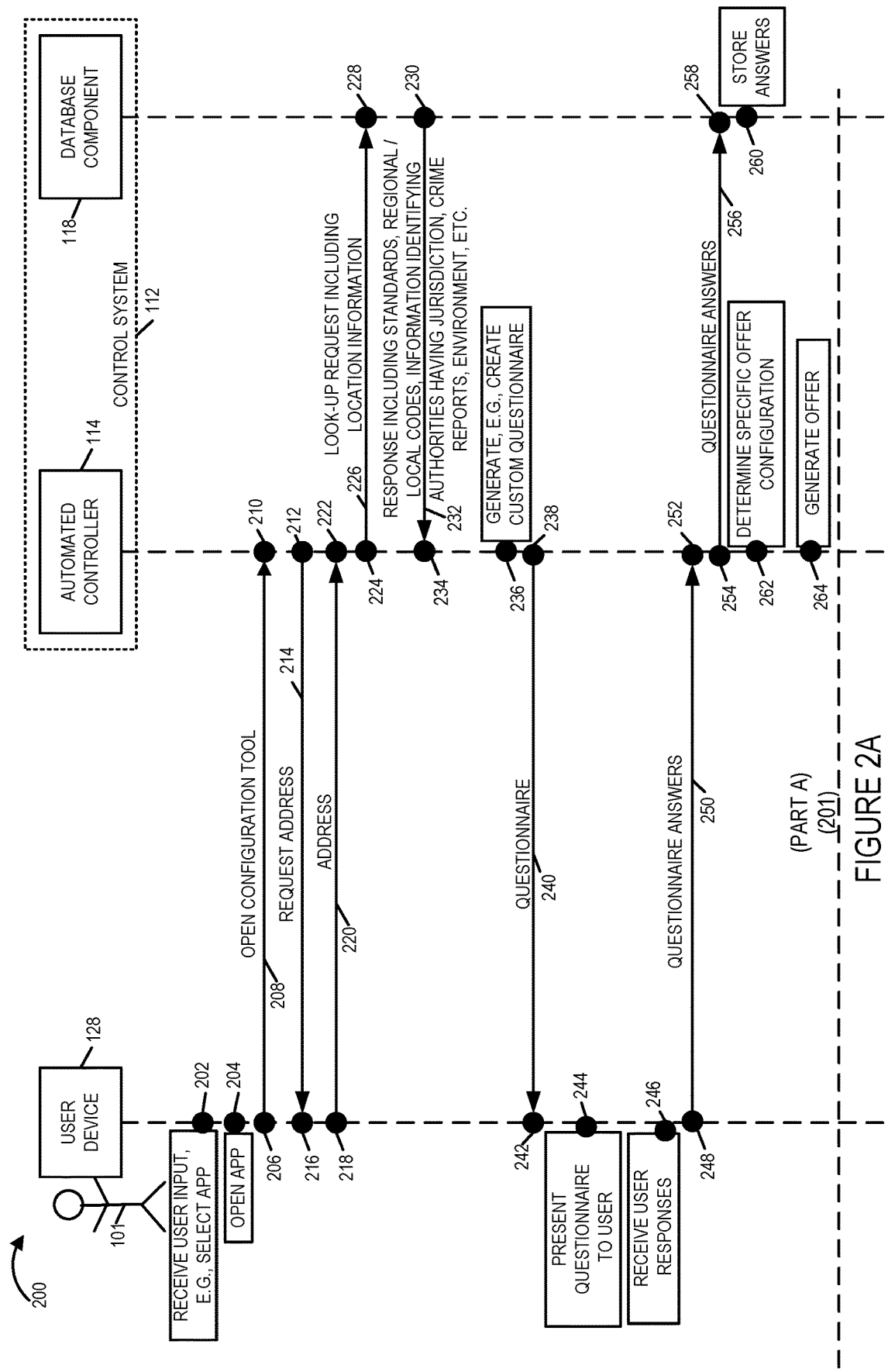
FIG. 2A is a first part of an exemplary order entry sequence for ordering a customized home automation and security system for a customer premises in accordance with an exemplary embodiment.
Figure 2B:
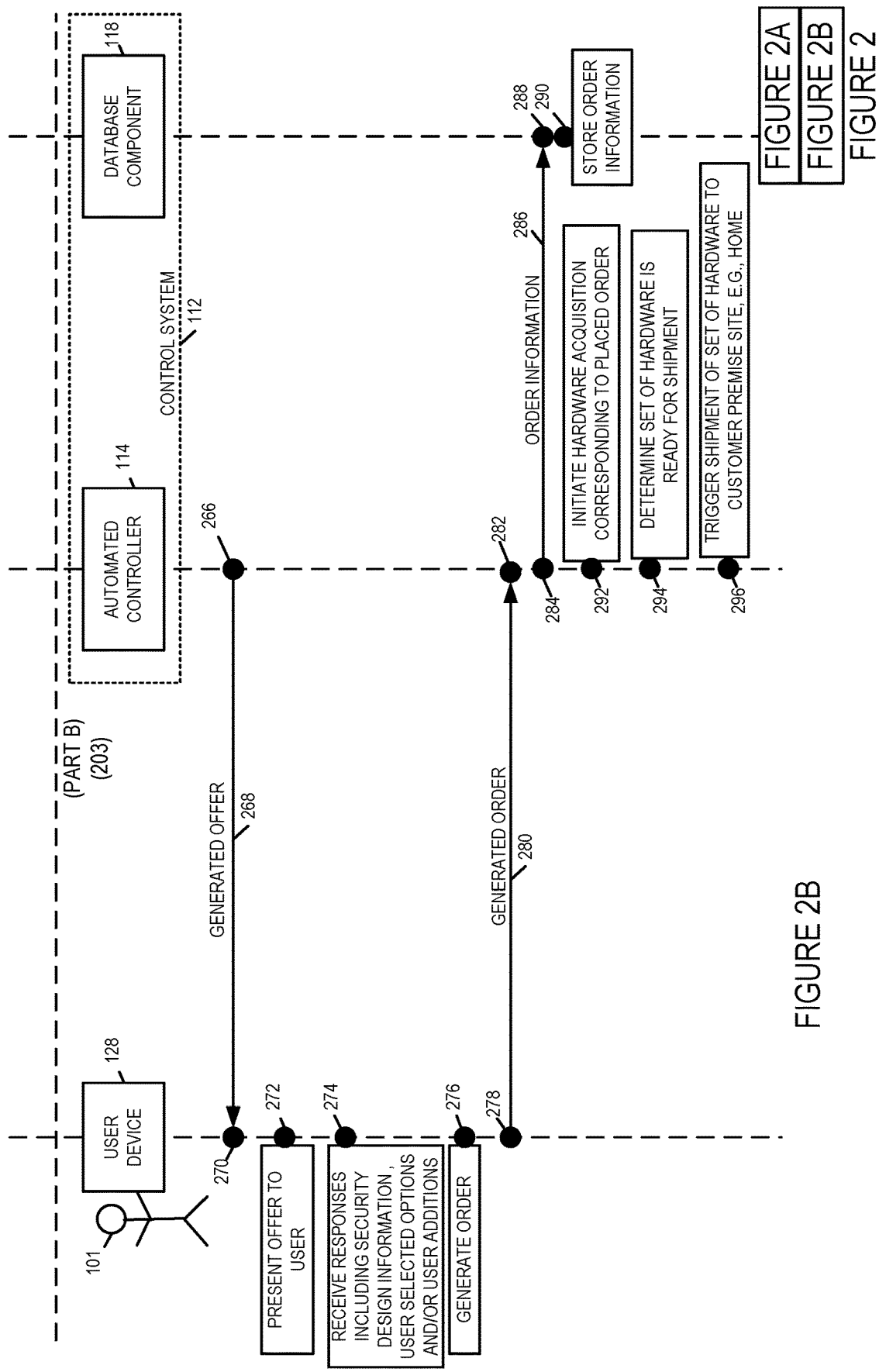
FIG. 2B is a second part of an exemplary order entry sequence for ordering a customized home automation and security system for a customer premises in accordance with an exemplary embodiment.
Figure 3B:
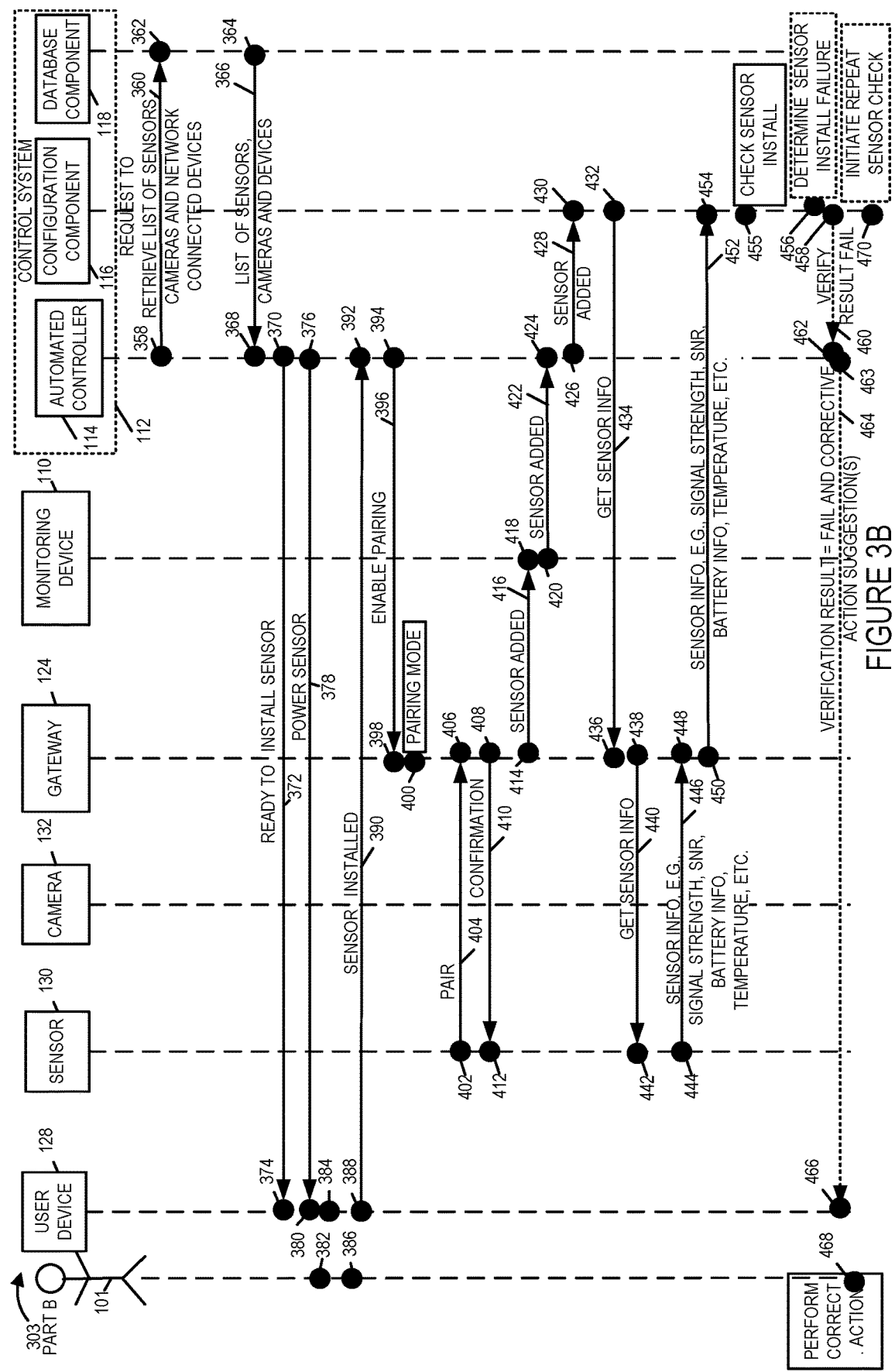
FIG. 3B illustrates a second part of exemplary installation and activation sequence of a home automation and security system in accordance with an exemplary embodiment.
Figure 3C:
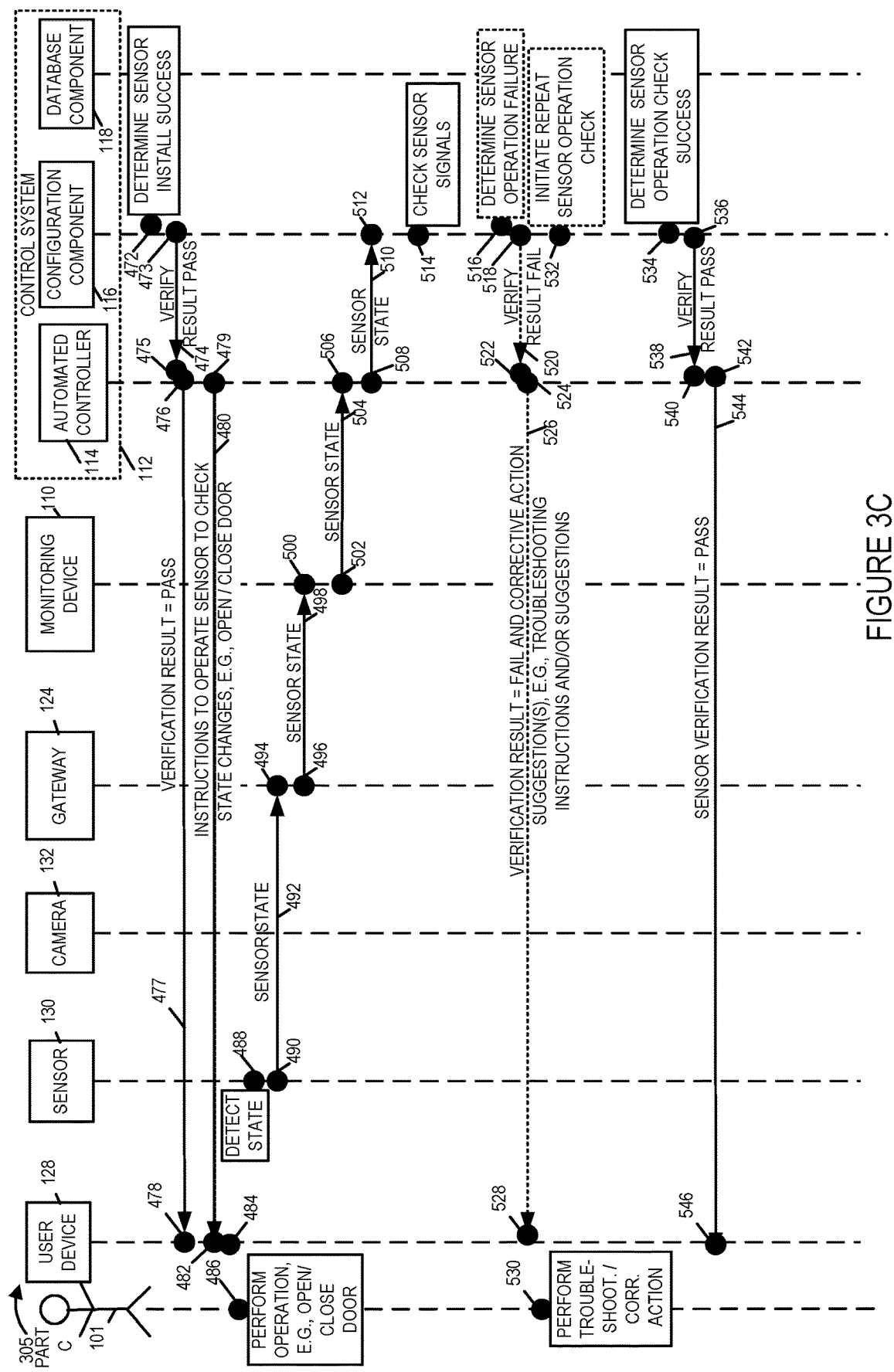
FIG. 3C illustrates a third part of exemplary installation and activation sequence of a home automation and security system in accordance with an exemplary embodiment.
Figure 3D:
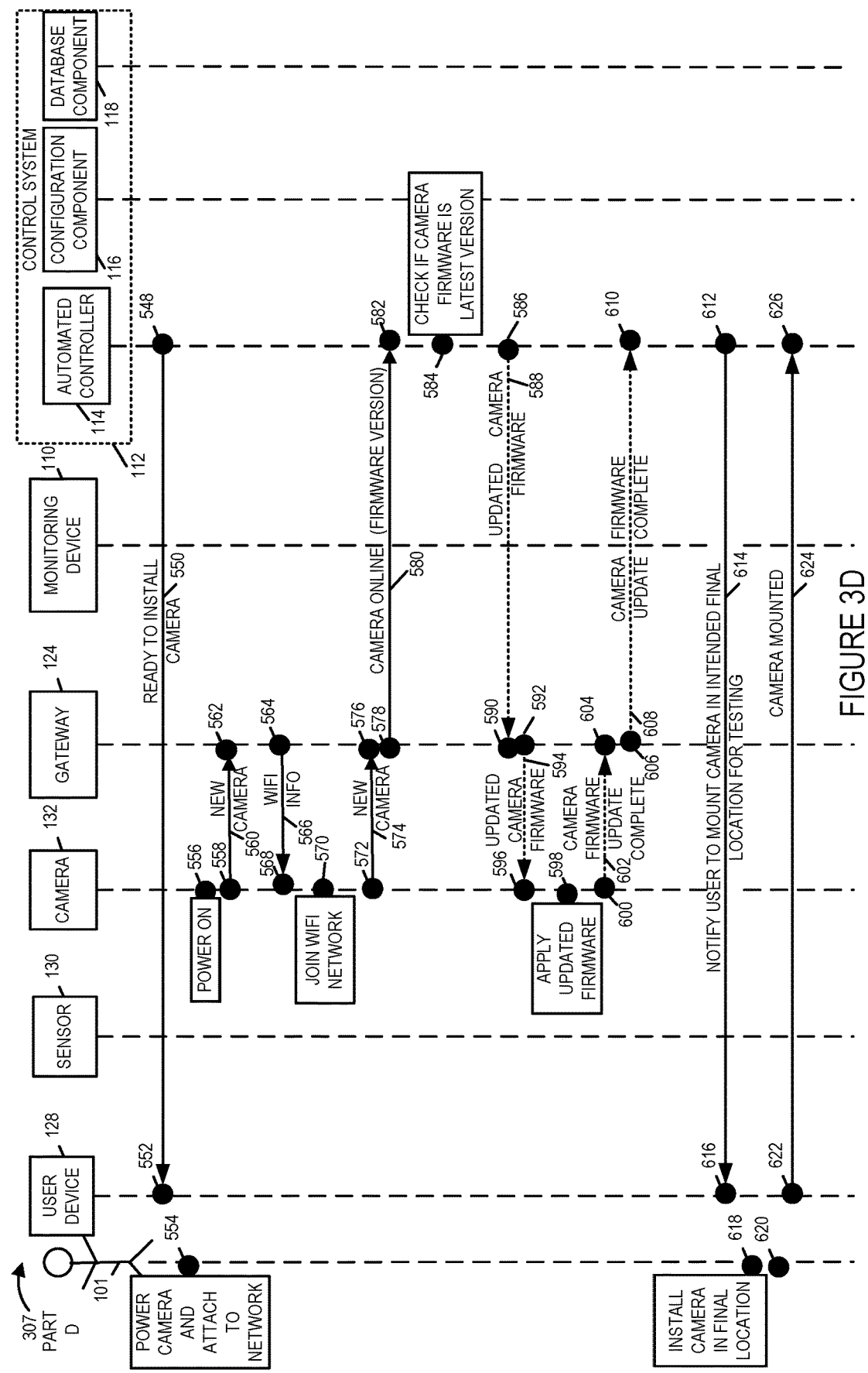
FIG. 3D illustrates a fourth part of exemplary installation and activation sequence of a home automation and security system in accordance with an exemplary embodiment.
Figure 3E:
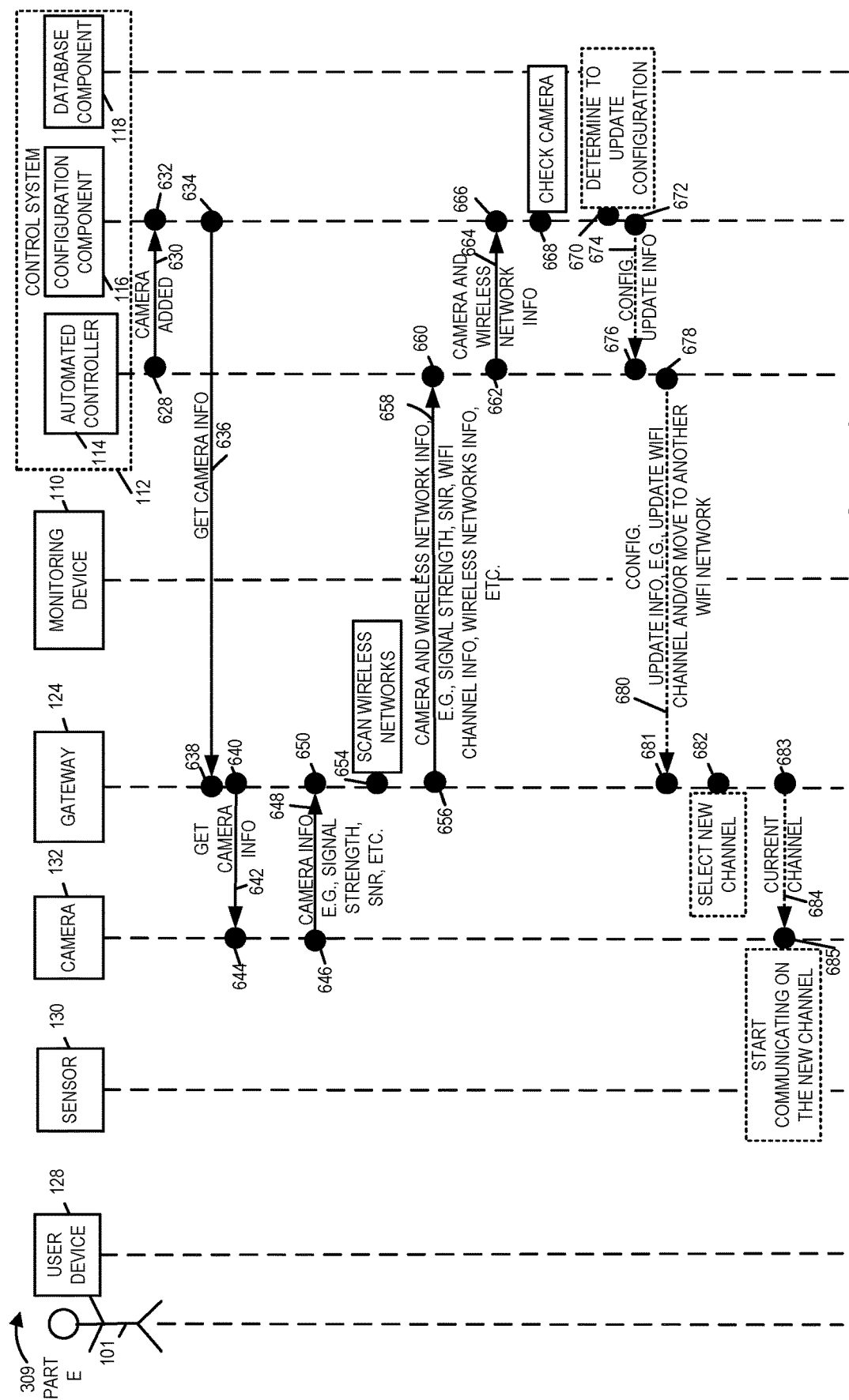
FIG. 3E illustrates a fifth part of exemplary installation and activation sequence of a home automation and security system in accordance with an exemplary embodiment.

FIG. 2, comprising the combination of FIG. 2A and FIG. 2B, is a drawing 200, comprising the combination of Part A 201 and Part B 203, of an exemplary order entry sequence for ordering a customized home automation and security system for a customer premises including components and services in accordance with an exemplary embodiment. In drawing 200, exemplary person 1 101, e.g., the homeowner of a home located at customer premises 1 106, is shown holding user device 128, e.g., person 1's smart phone. In drawing 100 of FIG. 1 automated controller 114 and database component 118 of control system 112 of home automation and security service system 102 are also shown. In some embodiments, user device 1 128 communicates with the automated controller 114 during the order entry sequence via gateway 124 and network 104. In some other embodiments, user device 1 128 communicates with the automated controller 114 during the order entry sequence via cellular base station 107 of cellular network 105 and network 104.

In step 202 user device 128 receives user input, e.g., input indicating that person 101 has selected an APP for a home automation and security service system. In step 204, in response to the received user input, user device 128 opens the selected APP and starts communicating with the automated controller 114. In step 206, user device 128 generates and sends a message 208 communicating that the automated controller 114 is to open the configuration tool. In step 210, automated controller 114 opens the configuration tool and starts sending messages to the user device including a request 214 for the address of the site for site which is to be configured for home automation and security services, e.g., the address of customer premises 1. In step 216 the user device 128 receives the request for address and displays the request. In step 218 user device receives the address, e.g., as typed input from the user 101, generates response message 220 including the received address, and sends the generated response message 220 to automated controller 114. In step 222, automated controller 114 receives message 220 and recovers the communicated address of the site to be monitored.

In some embodiments, the requests from the automated controller 114 to the user further includes a request to specify a general type of system that the user is interested in, e.g., select one of: (i) full system - internal and external site monitoring and additional smart device control, (ii) internal and external site monitoring, (iii) external site monitoring; and (iv) internal site monitoring. In some embodiments, the requests from the automated system to the user include a request to select on more of: (i) fire, smoke and gas, e.g., CO2, monitoring and (ii) security related monitoring. The user device sends the responses received by the user device of the user 101, e.g., customer, to the automated controller 114.

In step 224 the automated controller 114 generates and sends look-up request 226 including the received site location information, and in some embodiments, other user information, to database component 118. In step 228, database component 118 receives request 226 and recovers the communicated location information. In step 230, the database component generates a response 232 based on the received location information, and in some embodiments based on other received information from the user, and sends the response to the automated controller 114. Response 232 includes standards, regional and/or local codes, information identifying authorities having jurisdiction, crime reports, environment, etc., corresponding to the location. For example, the location may correspond to a high crime area or a low crime area. As another example, the location may correspond to a gated community, e.g., with private security guards, or to a location on an open road, e.g., a road. In different areas different types of crimes may be prevalent, e.g., home burglary, auto theft, attacks, armed robbery, etc. The location may correspond to a open location with street lighting or a location without street lighting. Different locations may correspond to different local, state, and/or federal codes, rules and/or standards which determine the types of equipment which are required, which are acceptable and/or which are allowed. For example, in some areas there may be restrictions on the types of exterior lighting which may be installed and the types of alarms which are acceptable. Different locations may correspond to different codes and/or standards which determine the types of equipment which are required and/or installation requirements, e.g., the acceptable local specification for a smoke detector and where, e.g., which room(s) a smoke detector is required to be located in, and the placement of the smoke detector or fire detector, e.g., installation placement specifications, distance from HVAC vents. Some locations may require CO2 detectors to be installed in residential homes while other locations may not. Different locations may require different lifetimes or requirements for a smoke or fire detector, e.g., before battery replacement is needed. Some locations may require audio alarms with a particular characteristic, e.g., level and/or frequency range or xenon strobe for accessibility requirements. Some locations may have different requirements for multi-unit dwellings as compared to single unit homes. Different locations may also correspond to different protocols and/or interfaces for communicating with the local authorities, e.g., police, fire, etc. Some locations may support an option to tie in of the home owner's external surveillance camera to the local police surveillance system. Some locations may require permits and/or fees for installation and/or connection to a local police and/or fire network or alarm monitoring center. Different types of sensors and/or different sensor sensitivity level setting may be suited to different environments. For example, in some areas animals may be likely to trigger some types of motion sensors. As another example, in different climates some types of sensors and/or surveillance cameras are not suitable due to the operation temperature range of the device and the expected temperature range of the location.

In step 234 the automated controller 114 receives response 232 and recovers the information communicated in the response. In step 236 the automated controller 114 generates, e.g., creates, a custom questionnaire 240 based on the information communicated in response 232, e.g., including detailed site specific information. In step 238 the automated controller sends the generated questionnaire 240 to user device 128. In step 242 the user device 128 receives the questionnaire 240 and recovers the communicated information. In step 244 the user device 128 presents the questionnaire to the user 101. In step 246 user device 128 receives user responses to the questions of the questionnaire. In step 248, the user device generates and sends messages 250 communicating the received questionnaire answers. In step 252 the automated controller 114 receives messages 250 and recovered the questionnaire answers. In some embodiments, the questionnaire answers include customer premises layout information, e.g., room, door, window, and/or other information allowing a floor plan layout to be generated for the customer premises location. In some embodiments, the questionnaire answers include information indicating one or more types of monitoring to be performed, e.g., break-in, fire, smoke, CO2 level monitoring, at the customer premises site in which the monitoring system is to be installed. In step 254, the automated controller 114 sends the received questionnaire answers in messages 256 to database component 118. In step 258 database component 118 receives the questionnaire answers and stores the answers in step 260. In some embodiments, the generated questionnaire is also sent to and stored in the database component. In some embodiments, stored previously generated questionnaires and stored previously received answers are used by automated controller 114 when generating a new questionnaire, e.g., for another site location in the same vicinity, e.g., the previously used questionnaires are refined over time.

In step 262, the automated controller 114 determines a specific offer configuration, e.g., a recommended set of surveillance cameras, a recommended set of sensors, a recommended home gateway, a recommended set of devices, e.g., controllable devices, recommended locations for installing the cameras, sensors and devices, recommended connections to local authorities, etc., based on information from the look-up request response 232 and the received questionnaire answers 250. In step 264 the automated controller 114 generates, based on the determined specific offer information, an offer to be presented to user 101 of user device 128. The generated offer includes, e.g., a site map plan illustrating installed recommended surveillance cameras, installed recommended sensors, and installed recommended control devices, detailed data specification sheets on recommended devices, and pricing information. In some embodiments, the offer includes selectable options, e.g., allowing a user to select between different alternative cameras. In step 266 the automated controller sends the generated offer 268 to user device 128, which in step 270 receives the offer 268 and recovers the information communicated in the offer. In step 272, the user device 128 presents the offer to user 101. In step 274 the user device receives responses from the user including security design information, user selected options and/or user additions. For example, the user may select most of the recommendations regarding the security layout, may reject some recommendations, e.g., does not want a camera in a particular room or area, may add one or more additional cameras and/or sensors, and may select which particular devices, from among a plurality of offered differently prices options, the user wishes to purchase. In some embodiments, the user is given an option to rent or lease at least some of the equipment, rather than purchase. In some embodiments, the user may select between new or reconditioned items.

In various embodiments, the offer presentation if step 272 is performed in conjunction with the received responses of step 274, e.g., portions of the offer presentation are modified in response to some detected responses, e.g., focusing additional details on an areas of interest.

In step 276, the user device 128 generates an order, e.g., a purchase order, for a home automation and security system, e.g., including ongoing services after installation, based on the presented offer and the received user responses received in step 274. In step 278 the user device 128 sends the generated order 280 to the automated controller 114, which is received in step 282. In step 284 the automated controller sends order information 286, corresponding to the generated order, to database component 118. In step 288 the database component 118 receives the order information and in step 290, the database component stores the received order information, e.g., to be available for future use during installation.

In step 292 the automated controller 114 initiates hardware acquisition, corresponding to the placed order, e.g., sending purchase orders to sub-contractors and/or sending stock retrieval orders to an in company warehouse, to fulfill the hardware acquisition requirements for the placed order. In some embodiments, the hardware acquisition includes additional items, in addition to the set of items required to make a one pass installation, e.g., additional items allowing for anticipated installation errors and/or sensor failures. For example, the additional items may include additional extra screws, additional extra mounting hardware, additional extra low cost sensors, additional extra cabling, etc., e.g., typical items that a professional installer may bring to an installation site as spares. In step 294 the automated controller 114 determines if a set of hardware is ready for shipment. In some embodiments, the step of determining if a set of hardware is ready for shipment includes determining that hardware components have been pre-configured and/or firmware loaded in accordance with instruction to satisfy the generated order. In some embodiments, determining if the set of hardware is ready for shipment includes receiving confirmation that each piece of hardware to be acquired has arrived and is ready to ship, e.g., allowing for a coordinated shipment to the customer premises.

In response to a determination, that the set of hardware is ready for shipment, e.g., the full set of hardware is ready for shipment, in step 296 the automated controller 114 triggers shipment of the set of hardware to the customer premises site, e.g. home. In some embodiments, step 296 includes triggering a coordinated shipment from multiple locations, e.g., multiple warehouses, such that the ordered set of system components should arrive at the customer premises site at approximately the same time, e.g., within a time window of a few days.

FIG. 3, comprising the combination of FIG. 3A, FIG. 3B, FIG. 3C , FIG. 3D, FIG. 3E and FIG. 3F is a drawing 300, comprising the combination of Part A 301, Part B 303, Part C 305, Part D 307 and Part E 309, and Part F 311, illustrating an exemplary installation and activation sequence of a home automation and security system in accordance with an exemplary embodiment. In step 302 user 101 inputs a start installation input to user device 128, e.g., user 101 clicks on a start installation box or icon being displayed on user device 128. In step 304 user device 128 receives the start installation input from user 101, and in response in step 306, user device 128 generates and sends a start new installation message 308 to automated controller 114. In step 310, automated controller 114 receives the start new installation message, and in response in step 312, automated controller 114 generates and sends message 314 to user device 128 communicating that user 101 should power the gateway and attach to home network. In step 316 user device 128 recovers message 314, and in step 318 user device 128 notifies user 101 to power on gateway 124 and attach to home network. In some embodiments, gateway 124 is a new gateway being installed at the site as part of the installation, e.g., a new gateway supporting local wireless communications, e.g., WiFi, ZigBee, Z-Wave, low power WAN, and BLE, with the new security cameras, new sensor, and new controllable devices being installed. In some embodiments, gateway 124, is an additional gateway being installed at the site in addition to an already installed gateway, e.g., the already installed gateway not supporting the full set of communications protocols utilized by the new devices being installed. In some embodiments, gateway 124 is an existing gateway already installed at the customer premises which fully supports communications with the new devices being installed. In step 320 user 101 powers gateway 124, e.g., plugs its in, and attaches gateway 124 to a network, e.g., a service provider communications network, e.g., a cable service provider communications network, coupled to the Internet.

In step 322 gateway 124 powers up, and in step 324 gateway 124 sends a heartbeat signal 326 to monitoring device 110, which is received by the monitoring device in step 328. In various embodiments, the heartbeat signal is a recurring signal. In step 324' gateway device 124 sends heartbeat signal 236' to monitoring device 110, which is received by the monitoring device 110 in step 328'. In some embodiments, the monitoring device 110 checks the received heartbeat signal data and characteristics, and/or time spacing between heartbeat signals against stored predetermined information to determine if the gateway 124 appears to be operating properly. In response to detected satisfactory heartbeat signal(s), in step 330, monitoring device 110 generates and sends a gateway connected signal 332 to user device 128. In step 334 user device 128 receives gateway connected signal 332 and display an indication, e.g., a message or icon, to user 101 indicating that the gateway is successfully connected to the network.

In step 336, gateway generates and sends signal 338 to monitoring device 110 communicating the firmware version currently installed on gateway 124. In step 340 monitoring device 110 receives signal 338 and recovers the firmware version being communicated. In step 342, monitoring device 110 determines if a gateway firmware update is needed. A gateway firmware update may be needed because gateway 124 is an old gateway previously installed at the site which needs an update, e.g., to support new protocols being used by at least some of the new devices to be installed or because the old firmware is outdated, e.g., includes some known software deficiencies. In some embodiments, the gateway firmware update is needed to install proprietary firmware, e.g., for supporting secure automation and security features.

If in step 342, monitoring device 110 determines that a firmware update is needed, then in step 344 monitoring device generates and sends signal 346 communicating updated firmware to gateway 124. In step 348, gateway 124 receives the updated software, and in step 350 gateway 124 applies the updated firmware, e.g., installs and activates the updated firmware within gateway 124. In step 352, gateway 124 detects that the firmware update has completed and generates and sends a firmware update complete message 354 to monitoring device 110, which is received by the monitoring device 110 in step 356.

In step 358, automated controller 114 sends a message 360 to database component 118 communicating a request to retrieve a list of sensors, cameras and network connected devices to be setup at customer premises 1 as part of the installation. In some embodiments, the request includes a purchase order number, customer number, customer name, and/or location, e.g., address, of the customer premises site where the installation is to occur, to find the list in the database. In step 362, database component 118 receives request 360, and in response, in step 364, database component generates and sends response 366 communicating the list of sensors, cameras and devices, to the automated controller 114. In some embodiments, the generated response 366 further includes installation instructions corresponding to the sensors, cameras and devices to be installed and a recommended installation sequence. In step 368 the automated controller receives response 366 and recovers the information communicated in response 366.

In step 370, automated controller 114 generates and sends a ready to install message 372 corresponding to one of the sensors on the received list. In various embodiments, the ready to install message includes information identifying the particular sensor to be installed, e.g., a door open/closed sensor manufactured by manufacturer ABC, to be installed on door jam 1 in room #1. In various embodiments, message 372 further includes installation instructions corresponding to the sensor to be installed, e.g., in accordance with government regulations and/or manufacture's recommendations. In step 374 user device 128 receives the ready to install message 372 and recovers the communicated information.

In step 376 automated controller 114 generates and sends power sensor message 378 to user device 128. In step 380 user device 128 receives the power sensor message 378 and notifies user 101 to power on sensor 130. In some embodiments, the notification includes instructions on how to power on the sensor, e.g., pull out a plastic insulation strip which allows the battery within the sensor to supply energy to the sensor's circuits, install a battery, install a plug in a wall socket, remove a cover from a solar collector, and/or turn on a switch. In some embodiments, an indication on the sensor, e.g., a green light, will indicate that the sensor is on and is receiving adequate power. In some embodiments, the power sensor notification message 378 includes information to be conveyed to the user of the expected result for a successful power on operation. In step 382 user 101 powers on sensor 130. During the installation of the sensor the sensor will be powered on by either plugging in the power cable or be engaging the battery on the sensor, e.g., prior to the installation being complete. This is because the battery enclosure is typically not accessible after the sensor has been installed, e.g., mounted on the door. In FIG. 3, the exemplary sequence shows the sensor being powered on prior to the installation of the sensor; however, in some embodiments, in which the sensor is powered on via a power plug or by engaging a battery which is accessible after sensor mounting, the sensor may be, and in some embodiments, is installed prior to being powered on. Thus in some embodiments, the power sensor message 378 is communicated after sensor installation is complete. In some embodiments, the information included in the power sensor message 378 is communicated in the ready to install sensor message 372.

In step 384, in response in step 374 the user device 128 presents user 101 with a message and/or indication to install the sensor, e.g., mount the door sensor parts in particular specified locations, e.g., a first part on the door jam and a second part on the door. In step 386 user 101 installs the sensor and enters an input to user device 128 indicating that the sensor has been installed. In step 3886, the user device 128 receives the input indicating that the sensor has been installed and generates and sends a sensor installed signal 390 to the automated controller 114, which is received by the automated controller 114, in step 392.

In step 394, automated controller generates and sends an enable pairing signal 396 to gateway 124, which receives the enable pairing signal in step 398. In step 400, in response to the received enable pairing signal, the gateway 124 enters pairing mode.

In step 402 sensor 130 generates and sends a pair signal 404 to gateway 124, which is received and detected by gateway 124 in step 406. In some embodiments, the user 101 is prompted to trigger the sensor, e.g., open and/or close the door the sensor is attached to, or walk in front of a motion detector, to complete the paring process. In step 408, in response to a determination that the pairing has been completed, based on the detected pair signal 404, and in some embodiments, based on detected expected signal(s) in response to one or more prompted sensor triggers, gateway 124 generates and sends confirmation signal 410, indicating that pairing is complete, to sensor 130, which is received by sensor 130 in step 412. In step 414 gateway 124 generates and sends sensor added signal 416 to monitoring device 110, which is received by monitoring device 110 in step 418. In step 420 monitoring device 110 generates and sends sensor added signal 422, which is a forwarded version of signal 416, to automated controller 114, which is received by automated controller 114 in step 424. In step 426 automated controller 114 generates and sends sensor added signal 428, which is a forwarded version of signal 416, to configuration component 116, which is received by configuration component 116 in step 430.

In step 432, in response to received sensor added signal 428, configuration component 116 generates and sends get sensor information signal 434 to gateway 124, which receives signal 434 in step 436. In step 438 gateway 124 generates and sends get sensor information signal 440 to sensor 130, which is received by sensor 130 in step 442. In step 444 sensor 130 collects sensor information and generates and sends sensor information signal 446 to gateway 124, which is received by gateway 124 in step 448. The sensor information communicated in signal 446 includes, e.g., signal strength, SNR, battery information, temperature, etc. In step 450, in response to received signal 446, gateway 450 generates and sends sensor information signal 452 to configuration component 116 which is received by configuration component 116 in step 454. The sensor information communicated in signal 452 includes, e.g., signal strength, SNR, battery information, temperature, etc. In some embodiments, the sensor information communicated in signal 452 includes the sensor information communicated in signal 446 plus additional information regarding the uplink wireless communications channel between sensor 130 and gateway 124.

In step 455 the configuration component checks the sensor installation for a pass or fail condition, e.g., comparing received information from signal 452 to predetermined acceptable limits.

If the checking criteria of step 455 indicates that the installation does not meet acceptable criteria, then step 456 is performed in which the configuration component 116 determines that the sensor installation was a failure and operation proceeds to step 458, in which the configuration component sends message 460 indications that the sensor installation verification testing indicated a fail. In various embodiments, message 460 further communicates the tested parameter or parameters which have failed and, in some embodiments, the values of the failed parameter(s). In step 462 automated controller 114 receives sensor installation failure notification message and recovers the communicated information. In step 463 the automated controller generates and sends sensor installation verification result notification message 464 to user device 128. In some embodiments, message 464 includes an indication that the verification result was a failure and optionally corrective action suggestion(s). In some embodiments, the corrective active suggestions are based on the receive parameter values communicated in message 460. Exemplary suggested corrective actions include, e.g., replace a battery in the sensor, remount the sensor at a different location, e.g., to attempt to obtain a better quality wireless communications channel between the sensor 130 and the gateway 124, discard a suspected defective sensor and install another sensor of the same type, discard the sensor and install an alternative sensor, e.g. higher quality sensor or different manufacturer sensor less susceptible to interference from local noise source being encountered at the site.

In step 466 user device receives message 464 and communicates the corrective action suggestion(s) to user 101. In step 468 user 101 performs a corrective action, e.g., following the instructions communicated in message 464.

In step 470 configuration component 116 initiates a repeat of the sensor checking operations. From step 470, operation proceeds to step 370 and steps through step 455 are repeated.

If the checking criteria of step 455, e.g. either in an initial pass or a repeat pass, indicates that the installation meet the acceptable criteria, then operation proceeds from step 455 to step 472 in which the configuration component determines that the sensor installation was successful. Operation proceeds from step 472 to step 473. In step 473 the configuration component generates and sends message 474 to automated controller 114 indicating that the sensor verification result for sensor 130 installation testing was a pass. In step 475 automated controller 114 receives message 474, and in step 476 automated controller 114 generates and sends message 477 indicating that the sensor verification result indicated a pass. In step 478, user device 128 receives message 477 recovers the communication information, e.g., test pass, and communicates to the user 101, e.g., installer, that the sensor installation checking test was successful. In step 479 automated controller 114 generates and sends message 480 communication instructions to operate sensor 130 to check state changes, e.g., open or close a door whose open/close status is being monitored by sensor 130. In step 482, user device 128 receives message 480 and recovers the information being communicated. In step 484 the user device communicates, e.g., displays, instructions to user 101 instructing the user 101 to perform an action or action to test the sensor, e.g., test sensor state changes. For example, the user 101 may be commanded to open or close the door. In some embodiments, the operator may be commanded to perform a sequence of events, e.g., over a predetermined time interval. For example, the operation may be instructed to open the door, leave the door in the open position for 10 seconds, then close the door, then leave the door in the closed position for 20 second, and then repeat the sequence 4 additional times. In step 486, user 101 performs an operation to test the sensor, e.g., opening and/or closing a door in accordance with the communicated instructions. In step 488 sensor 130 detects sensor state and in step 490 sensor 130 generates and sends message 492 communicating the detected sensor state to gateway 124. In step 494 gateway 124 receives message 492, and in step 496 gateway 124 generates and sends message 498 to monitoring device 110 communicating the detected sensor state. In step 500 monitoring device 110 receives message 498, and in step 502 monitoring device 110 generates and sends message 504 to automated controller 114 communicating the detected sensor state. In step 506 automated controller 114 receives message 504, and in step 508 automated controller 114 generates and sends message 510 to configuration component 116 communicating the detected sensor state. In step 512 configuration component 116 receives message 510, and recovers the communicated sensor state, which is a forwarded version of the information communicated in message 492. In step 514, the configuration component 116 checks the sensor signals, e.g., checks the received sensor state signals against expected sensor state signals, to determine if the sensor appears to be operating properly. For example, does the received sensor state signal indicate that the door is closed during the time when the user 101 has been commanded to have the door in a closed position, and does the sensor state signal indicate that the door is in an open position during the time when the operator has been commanded to have the door in an open position.

Consider that the determination is that the sensor is not operating properly, e.g., detected sensor state signals do not match expected sensor state signals, then operation proceeds from step 514 to step 516, in which the configuration component determines that the sensor operation is a failure. Operation proceeds from step 516 to step 518. In step 518 the configuration component 116 generates and sends a message 520 to the automated controller 114 indicating that the sensor operation verification test result indicates failure. In step 522, the automated controller 114 receives message 520, and in response in step 524 the automated controller generates and sends message 526 to the user device 128 indicating that the verification result for the sensor operational test was a failure and further including corrective actions suggestion(s), e.g., troubleshooting instructions and/ or suggestions. For example, the suggestions may include ,e.g., a recommendation to check alignment between two portion of a door sensor when the door is closed and to remount a sensor portion to correct a detected misalignment, or to measure an air gap between two portions of a door sensor when the door is in the closed position to determine if the air gap exceeds acceptable tolerances and/or to shim a portion of a door sensor to adjust an out of spec air gap.

In step 528 user device 128 receives message 526 and communicates the information in message 526 to user 101. In step 530 user 101 performs troubleshooting and/or performs corrective actions, e.g., in accordance with the communicated instructions.

In step 532 configuration component 116 initiates a repeat of the sensor operation check. From step 532, operation proceeds to step 479, and steps 479 through step 512 are repeated in which sensor operation is re-tested, e.g., sensor state and/or sensor state changes are re-tested.

If the checking of step 514, e.g. either in an initial pass or in a repeat pass, indicates that the sensor operation meets acceptable criteria, then operation proceeds from step 514 to step 534 in which the configuration component 116 determines that the sensor installation was successful. Operation proceeds from step 534 to step 536. In step 536 the configuration component 116 generates and sends message 538 to automated controller 114 communicating that the sensor operational verification test(s) have passed. Automated controller 114 receives message 538 in step 540, and in step 542 generates and sends message 544 to user device 128 communicating that sensor 130 has passed the sensor operational checks. Message 544 is received in step 546 by user device 128 which communicates in step 546 to user 101 that the installation and testing with regard to sensor 130 is completed and has been successful.

In step 548 automated controller 114 generates and sends ready to install camera message 550 to user device 128. In step 552 user device 128 receives message 550 and communicates to user 101 that camera 132 should now be powered on and attached to the network. In some embodiments, message 550 further includes instructions for powering on the camera and/or for attaching to the network. In step 554, user 101 powers on camera 132 and, in some embodiments, attaches the camera to the network, e.g., by plugging the camera into the network using an Ethernet cable. In some embodiments, powering on the camera includes plugging the camera into a wall socket or installing batteries and turning a power switch on. In some embodiments, powering on the camera includes attaching a solar collector panel to the camera and positioning the solar collector panel in a predetermined direction. In step 556 the camera is powered on. In step 558 camera 132 generates and sends a message 560, e.g., including camera 132 ID information, to gateway 124 communicating that a new camera is now active and wishes to join the WiFi network. In step 562 gateway 124 receives message 560 and recovers the communicated information. In step 564, in response to received message 560, gateway 124 generates and sends WiFi information 566 to camera 132. In step 568 camera 132 receives the WiFi information 566, and in response in step 570, the camera 132 joins the WiFi network. In step 572 camera 132 generates and sends a new camera message 574 to gateway 124 communicating to gateway 124 that camera 132 has successfully joined the WiFi network. In step 576, gateway 124 receives message 574 and recovers the communicated information including camera ID information and information indicating the version of firmware currently on camera 124. In step 578 gateway 124 generates and sends message 580 to automated controller 114 communicating that new camera 132 is now online and communicating the version of firmware currently installed on camera 132. In step 582, automated controller 114 receives message 580 and recovers the communicated information. In step 584 automated controller 114 checks if the camera firmware currently on camera 132 is the latest version firmware. If the determination of step 584 is that the firmware is not the latest version, then operation proceeds from step 584 to step 586 to initiate a camera firmware update; otherwise, operation proceeds from step 584 to step 610.

In step 586 automated controller 114 generates and sends signals 588 communicating updated camera firmware. In step 590 gateway 124 receives signals 588, and in step 592 the gateway forwards the received updated camera firmware in generated signals 594. In step 596 camera 132 receives signals 594 and recovers the updated camera firmware. In step 598 camera 132 applies, e.g., installs, the updated camera firmware. In step 600 camera 132 generates and sends signal 602 communicating that the camera firmware update has completed. In step 604 gateway 124 receives signal 602 and in step 606 generates and sends signal 608, communicating that the camera 132 firmware update is complete, to automated controller 114 which receives message 608 in step 610 and update status information regarding camera 132 to indicate that the firmware update has completed and storing the version number of the updated camera firmware which is now associated with camera 132.

In step 612 automated controller 114 generates and sends message 614 to user device 128 which communicates information to notify the user, e.g., person 101 who is performing the installation, to mount camera 132 in the intended final location for testing. In some embodiments, message 614 includes camera mounting instruction including, e.g., instructions regarding: mounting hardware used, tools needed, location to be mounted, camera orientation, and step by step procedures to be followed. In step 616 user device 128 receives message 614 and notifies the user to start mounting camera 132 and further presents the camera mounting instruction sequence to the user. In step 618 person 101 installs the camera in its final location. In step 620 person 101, e.g., the installer, enters an input to user device 128 indicating that the camera mounting is complete. In step 622 user device 128 receives the user input indicating that the camera is mounted and generates and sends camera mounted message 624 to automated controller 114 to notify the automated controller 114 the camera is mounted in its final intended location and further testing can now proceed. In some embodiments, camera 132 sends an installation complete message and/or camera ready message to automated controller 114 via gateway 124. In step 626 automated controller 114 receives camera mounted message 624 and updates stored information to indicate that camera 132 has been mounted.

In step 628 the automated controller 114 generates and sends camera added message 630 to configuration component 116, which is received in step 632 by the configuration component 116. In step 634 configuration component 116 generates and sends get camera information message 638 to gateway 124, which receives message 636 in step 638 and generates and sends get camera information message 642 to camera 132 in step 640.

In step 644, camera 132 receives get camera information message 642, and camera 132 performs measurements, e.g., communications channel measurements, used to generate a set of camera data. In step 646 camera 132 generates message 648 including a set of camera information, e.g., signal strength, SNR, etc. , and sends, e.g., transmits, the generated message 648 to gateway 124, which receives message 648 in step 650 and recovers the communicated camera information. In step 654 gateway 124 scans the wireless networks, e.g., which may include public and private wireless networks, and obtains scan results for the wireless networks. The networks may correspond to a network currently being used by the camera 132 and gateway 124 and other alternative networks which may be used by the camera 132 and gateway 124. In various embodiments, the camera will only use one of the SSIDs provided by the gateway 124. In some embodiments, the gateway 124 will manage the radio resource by moving to a different RF frequency, e.g., 2.4 GHz or 5 GHz, or moving to a different channel that has better signal strength and less interference. The gateway 124 will tell the camera 132 which SSID and frequency to use. Channel changes are seamless to WiFi clients, e.g., camera 132.

In step 656 gateway 124 generates and sends message 658 to automated controller 114, message 658 communicating camera and wireless network information, e.g., signal strength, SNR, WiFi channel information, wireless networks information etc. Message 658 communicates both information collected by camera 124 and information, e.g., wireless network scan results information, collected by gateway 124. In step 660 automated controller 114 receives message 658 and generates and sends message 664 to the configuration component 116, message 664 including camera and wireless network information communicated in message 658. In step 666 configuration component 116 receives message 654 and recovers the communicated camera and wireless network information. In step 668 the configuration component checks, based on the received camera and wireless network information, the camera 132, e.g., determines if the camera operation and camera communications are satisfactory. In some embodiments, in step 668 the configuration component 116 checks if camera operation and/or camera communications can be improved, e.g., by making a configuration change. Consider that the check of step 668 determines that camera operation and/or camera communications are unsatisfactory or are satisfactory but can be improved by making a configuration change. In some such embodiments, operation proceeds from step 668 to step 670 in which the configuration component 116 determines to update the configuration. In step 672 configuration component 116 generates and sends message 674 to automated controller 114 communicating configuration update information. In step 676 automated controller 114 receives message 674 and generates and in step 678 sends message 680 to gateway 124, message 680 forwarding the configuration update information included in message 674. The configuration update information includes, e.g., an update, e.g., a change of the WiFi channel(s) being used by camera 132 and gateway 124 to communicate with one another or an update, e.g., change of the network being used by the camera 132 and gateway 124 to communication with one another. In some embodiments, the network update is a change from a first WiFi network supported by gateway 124 to a second WiFi network supported by gateway 124, the second WiFi network having a lower current level of loading than the first WiFi network. In some embodiments, the network update is a change from a first WiFi network supported by gateway 124 to a second WiFi network supported by gateway 124, the second WiFi network having better quality channels than the first WiFi network. In some embodiments, the network update is a change from a first WiFi network supported by gateway 124 to a second WiFi network supported by gateway 124, the second WiFi network having a higher level of security than the first WiFi network. In step 681, gateway 124 receives message 680 and recovers the communicated configuration update information. Operation proceeds from step 681 to step 682. In this example, in step 682 gateway 124 selects a new channel, e.g., a new WiFi channel, for communications with camera 132 in response to message 680. In another example, the gateway 124 may switch to another network for communications with the camera 132, e.g., a first WiFi network to a second WiFi network or a WiFi network to a BLE network.

In step 683, gateway 124 generates and sends, e.g., transmits, a message 684, communicating update information. For example, in one embodiment, the gateway 124 creates the WiFi and determines the channel, and there is only one channel available at a given time. Consider that the gateway 124 has decided to change channels. The gateway 124 communicates information identifying the current channel which is available, which is a new channel, in a broadcast message, e.g., a recurring broadcast message which is transmitted irrespective of whether or not a channel change has occurred. In step 685 camera 132, e.g., which has been monitoring for the broadcast message as part of its typical scan operations, receives message 684 recovers the communicated information, and implements the change, e.g., starts communicating with gateway 124 on the new channel that is now being used by the gateway 124.

In step 686 gateway 124 generates and sends get camera information message 688 to camera 132. In step 690, camera 132 receives get camera information message 688, and camera 132 and performs measurements, e.g., communications channel measurements, used to generate a set of camera data. In step 692 camera 132 generates message 694 including a set of camera information, e.g., signal strength, SNR, etc., and sends, e.g., transmits, the generated message 694 to gateway 124, which receives message 694 in step 696 and recovers the communicated camera information. In step 698 gateway 124 scans the wireless networks, e.g., which may include public and private wireless networks, and obtains scan results for the wireless networks. The networks may correspond to a network currently being used and other alternative networks which can be used by the camera 132 and gateway 124. In step 700 gateway 124 generates and sends message 702 to automated controller 114, message 702 communicating camera and wireless network information, e.g., signal strength, SNR, WiFi channel information, wireless networks information etc.

Message 702 communicates both information collected by camera 124 and information, e.g., wireless network scan results information, collected by gateway 124. In step 704 automated controller 114 receives message 702 and in step 706 generates and sends message 708 to the configuration component 116, message 708 including camera and wireless network information communicated in message 702. In step 710 configuration component 116 receives message 708 and recovers the communicated camera and wireless network information. In step 712 the configuration component 116 checks, based on the received camera and wireless network information of message 708, the camera 132, e.g., determines if the camera operation and camera communications are satisfactory. In some embodiments, in step 712 the configuration component 116 checks if camera operation and/or camera communications can be improved, e.g., by making a configuration change. Consider that the check of step 712 determines: (i) that camera operation and/or camera communications are satisfactory and cannot be improved or (ii) that camera operation and/or camera communications are satisfactory and can be improved but it is not considered worthwhile to make a configuration change, e.g., the improvement would only be marginal. In some such embodiments, operation proceeds from step 714 to step 716 in which the configuration component 116 determines that the camera check is ok. In step 716 configuration component 116 generates and sends message 718 to automated controller 114 communicating that the camera operation verification test result=pass. In step 720 automated controller 114 receives message 718, and in step 722 the automated controller 114 generates and sends message 724 to user device 128, message 724 forwarding the information that the camera 132 has passed its verification test. In step 726, user device 128 receives message 724 and communicates, e.g., displays an indication to user 101 that camera 132 has passed its verification test.

Additions sensors, additional cameras and/or additional controllable devices, can be, and in some embodiments, are installed in a similar manner to the installations already described above.

In step 728, automated controller 114 determines that the installation is complete, e.g., each of the devices in the installation order, have been: mounted, initialized, updated, configured, tested for basic functional operation, tested for acceptable communications with the gateway, and/or tested for appropriate state signals in response to different user forced sensor conditions, and the final test results are deemed satisfactory. Operation proceeds from step 728 to step 730. In step 730 the automated controller 114 generates and sends message 732 to monitoring device 110, informing the monitoring device 110 to place the account corresponding to the completed installation in service. In step 734 monitoring device 110 receives message 732 and in step 736 monitoring device 110 places the account corresponding to the installation into service, e.g. activates the home automation and monitoring system at the customer premises site and starts providing services.

In step 738 automated controller 114 generates and sends installation and verification complete message to user device 128, which receives message 740 in step 742 and notifies user 101 that the system is now completely installed and has been activated.

Figure 4:
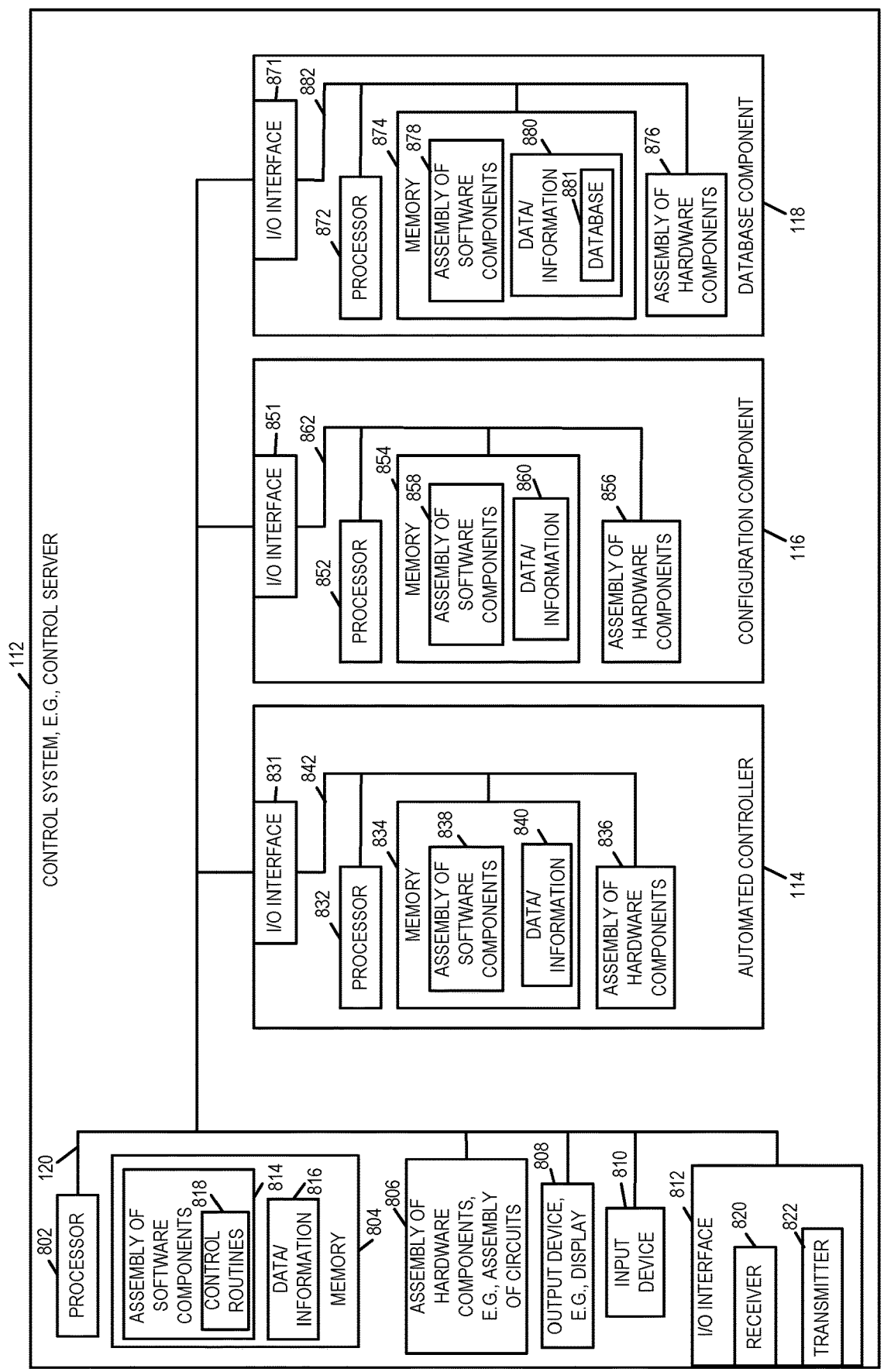
FIG. 4 is a drawing of an exemplary control system, e.g., a control server, which may be included in a home automation and security service system in accordance with an exemplary embodiment.

FIG. 4 is a drawing of an exemplary control system 112, e.g., a control server, in accordance with an exemplary embodiment. Control system 112 may be included in the home automation and security service system 102 of FIG. 1. Control system 112 includes a processor 802, e.g., a CPU, a memory 804, an assembly of hardware modules 806, e.g., assembly of circuits, an output device 808, e.g., a display, an input device 810, e.g., a keyboard and/or mouse, an I/O interface 812, an automated controller 114, a configuration component 116, and a database component 118 coupled together via a bus 120 over which the various elements may interchange data and information. In some embodiments, control system 112, e.g., a control server, is a rack type device. In some such embodiments, each of automated controller 114, configuration component 116 and database component 118 are different circuit cards which plug into the rack.

Memory 804 includes assembly of software components 814 and data/information 816. Assembly of software components, e.g., an assembly of software modules, includes control routines 818. I/O interface 812 includes a receiver 820 and a transmitter 822 for coupling the control system 112 to monitoring device 122 and to other networks and/or the Internet.

Automated controller 114 includes an I/O interface 831 including a receiver and transmitter, a processor 832, e.g., a CPU, memory 834, and an assembly of hardware components 836, e.g., an assembly of circuits, coupled together via a bus 842 over which the various elements may interchange data and information. Memory 834 includes an assembly of software components 838 and data/information 840.

Configuration component 116 includes an I/O interface 851 including a receiver and transmitter, a processor 852, e.g., a CPU, memory 854, and an assembly of hardware components 856, e.g., an assembly of circuits, coupled together via a bus 862 over which the various elements may interchange data and information. Memory 854 includes an assembly of software components 858 and data/information 860.

Database component 118 includes an I/O interface 871 including a receiver and transmitter, a processor 872, e.g., a CPU, memory 874, and an assembly of hardware components 876, e.g., an assembly of circuits, coupled together via a bus 882 over which the various elements may interchange data and information. Memory 874 includes an assembly of software components 878 and data/information 880. Data/information 880 includes database 881.

Figure 5:
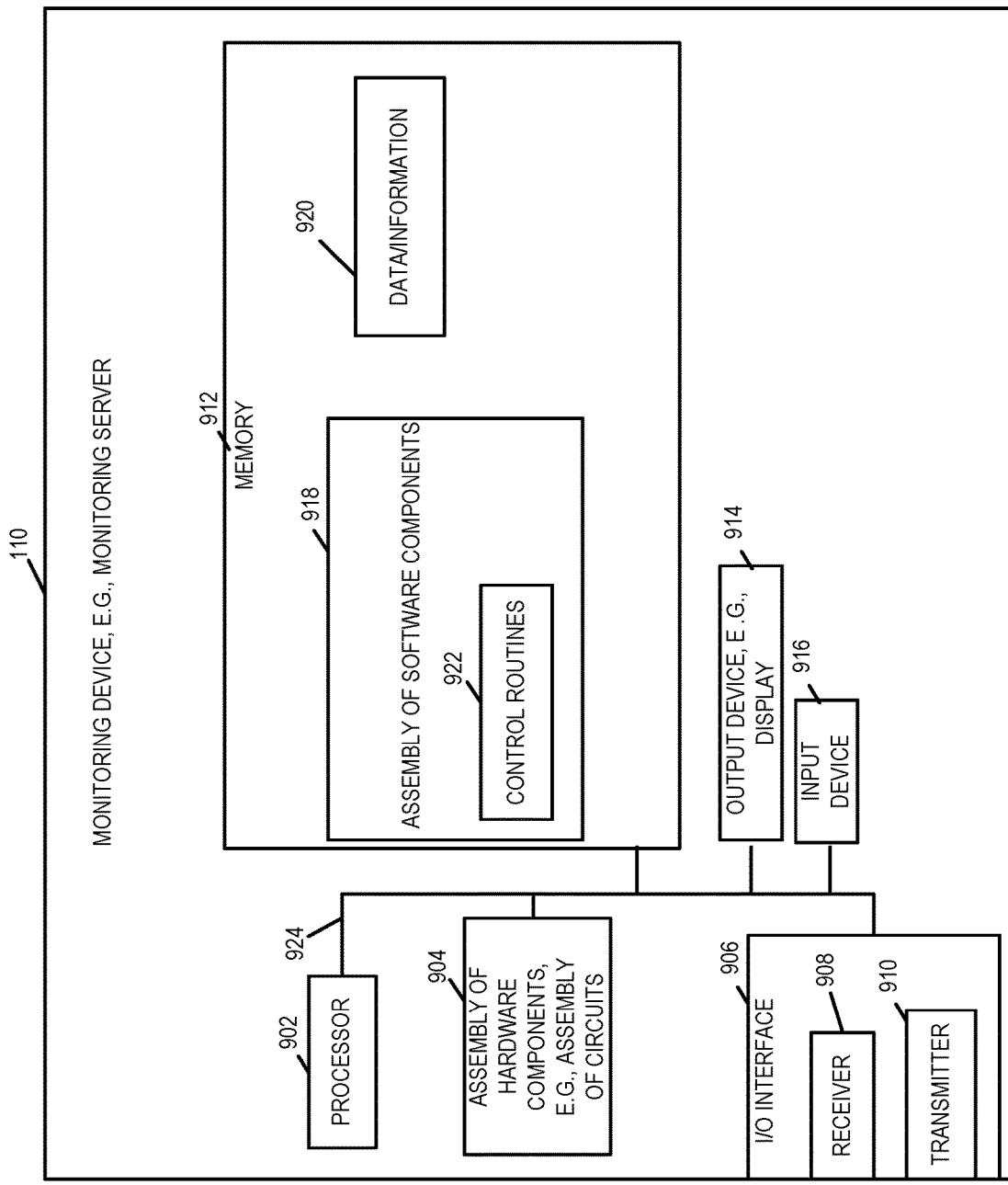
FIG. 5 is a drawing of an exemplary monitoring device, e.g., a monitoring server, which may be included in an exemplary home automation and security service system in accordance with an exemplary embodiment.

FIG. 5 is a drawing of an exemplary monitoring device 110, e.g., a monitoring server, in accordance with an exemplary embodiment. Monitoring device 110 may be included in the home automation and security service system 102 of FIG. 1. Monitoring device 110 includes a processor 902, e.g., a CPU, a memory 912, an assembly of hardware modules 904, e.g., assembly of circuits, an I/O interface 906 including a receiver 908 and a transmitter 910, an output device 914, e.g., a display, and an input device, e.g., a keyboard and/or mouse, coupled together via a bus 924 over which the various elements may interchange data and information. Memory 912 includes an assembly of software components 918 and data/information 920. Assembly of software components 918, e.g., an assembly of software modules, includes control routines 922.

Figure 6:
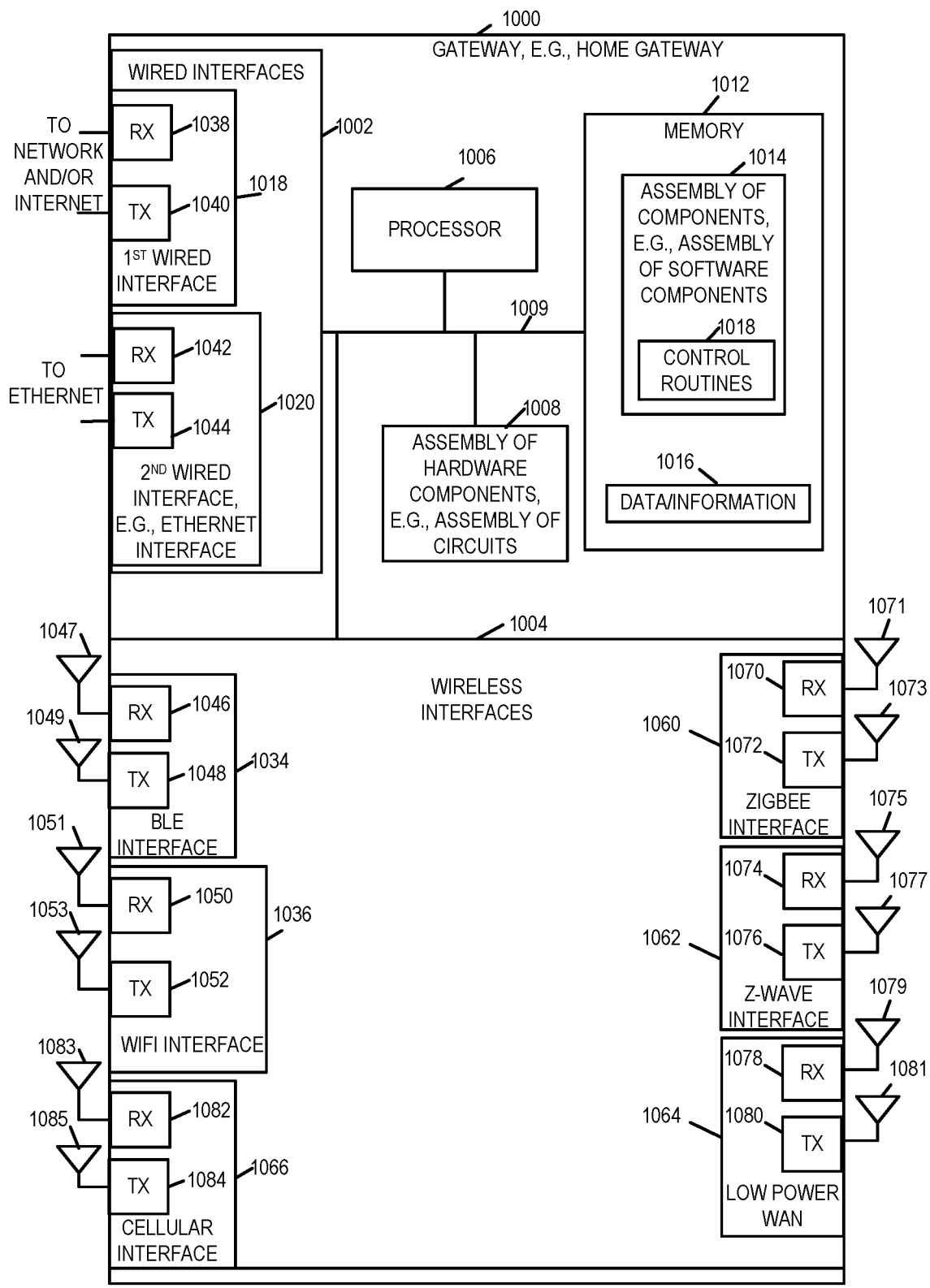
FIG. 6 is a drawing of an exemplary gateway, e.g., a home gateway, which may be installed at a customer premises site which is to be monitored and/or received home automation services, in accordance with an exemplary embodiment.

FIG. 6 is a drawing of an exemplary gateway 1000, e.g., a home gateway, in accordance with an exemplary embodiment. Exemplary gateway 1000 is, e.g., gateway 124 of system 100 of FIG. 1. Gateway 1000 includes wired interfaces 1002, wireless interfaces 1004, a processor 1006, e.g., a CPU, an assembly of hardware components 1008, e.g., an assembly of circuits, and memory 1012 coupled together via a bus 1009 over which the various elements may interchange data and information. Wired interfaces 1002 includes a first wired interface 1018 including receiver 1038 and transmitter 1040 and a second wired interface 1020 including receiver 1042 and transmitter 1044. First wired interface 1018 is coupled to a network and/or the Internet, e.g., coupled to network 104 in FIG. 1. Second wired interface 1020 is coupled to an Ethernet, e.g., a local Ethernet being used at a customer premises site in which gateway 1000 is located. In some embodiments, one or more cameras, sensor and/or network connected devices, e.g., a controllable light, controllable alarm, controllable appliance, etc., at the customer premises site are coupled to gateway 1000 via the second wireless interface 1020.

Wireless interfaces 1004 includes a Bluetooth Low Energy (BLE) interface 1034, a ZigBee interface 1060, Z-Wave interface 1062, a low power WAN interface 1064, and a WiFi interface 1036. In some embodiments, the wireless interfaces 1004 includes a cellular wireless interface 1066. BLE interface 1034 includes a receiver 1046 coupled to receive antenna 1047 via which the gateway 1000 can receive BLE signals, e.g., BLE signals from devices, e.g., user devices, cameras, sensors, and/or network connected devices, supporting BLE. BLE interface 1034 includes a transmitter 1048 coupled to transmitter antenna 1049 via which the gateway 1000 can transmit BLE signals, e.g., BLE signals to devices, e.g., user devices, cameras, sensors, and/or network connected devices, supporting BLE.

WiFi interface 1036 includes a receiver 1050 coupled to receive antenna 1051 via which the gateway 1000 can receive WiFi signals, e.g., WiFi signals from devices, e.g., user devices, cameras, sensors, and/or network connected devices, supporting WiFi. WiFi interface 1036 includes a transmitter 1052 coupled to transmitter antenna 1052 via which the gateway 1000 can transmit WiFi signals, e.g., WiFi signals to devices, e.g., user devices, cameras, sensors, and/or network connected devices, supporting WiFi. In some embodiments, the same antenna is used for one or more transmitters and/or receivers in gateway 1000.

ZigBee interface 1060 includes a receiver 1070 coupled to receive antenna 1071 via which the gateway 1000 can receive ZigBee signals, e.g., ZigBee signals from devices, e.g., user devices, cameras, sensors, and/or network connected devices, supporting ZigBee. ZigBee interface 1060 includes a transmitter 1072 coupled to transmitter antenna 1073 via which the gateway 1000 can transmit ZigBee signals, e.g., ZigBee signals to devices, e.g., user devices, cameras, sensors, and/or network connected devices, supporting ZigBee.

Z-Wave interface 1062 includes a receiver 1074 coupled to receive antenna 1075 via which the gateway 1000 can receive Z-Wave signals, e.g., Z-Wave signals from devices, e.g., user devices, cameras, sensors, and/or network connected devices, supporting Z-Wave. Z-Wave interface 1062 includes a transmitter 1076 coupled to transmitter antenna 1077 via which the gateway 1000 can transmit Z-Wave signals, e.g., Z-Wave signals to devices, e.g., user devices, cameras, sensors, and/or network connected devices, supporting Z-Wave.

Low Power WAN interface 1064 includes a receiver 1078 coupled to receive antenna 1079 via which the gateway 1000 can receive low power WAN signals, e.g., low power WAN signals from devices, e.g., user devices, cameras, sensors, and/or network connected devices, supporting low power WAN. Low Power WAN interface 1064 includes a transmitter 1080 coupled to transmitter antenna 1081 via which the gateway 1000 can transmit low power WAN signals, e.g., low power WAN signals to devices, e.g., user devices, cameras, sensors, and/or network connected devices, supporting low power WAN.

Cellular wireless interface 1066 includes a receiver 1082 coupled to receive antenna 1083 via which the gateway 1000 can receive cellular wireless signals, e.g., LTE, 3GPP, 4GPP, CDMA, GSM, and/or TDMA cellular wireless signals from devices, e.g., user devices, cameras, sensors, and/or network connected devices, supporting cellular wireless signaling. Cellular wireless interface 1066 includes a transmitter 1084 coupled to transmitter antenna 1085 via which the gateway 1000 can transmit cellular wireless signals, e.g., LTE, 3GPP, 4GPP, CDMA, GSM, and/or TDMA cellular wireless signals to devices, e.g., user devices, cameras, sensors, and/or network connected devices, supporting cellular wireless signaling. In some embodiments, the same antenna is used for one or more transmitters and/or receivers in gateway 1000.

In some embodiments, the WiFi interface supports multiple communications bands. In various embodiments, the WiFi interface 1036 supports 2.4 GHz and 5 GHz, and supports multiple SSIDs. In some embodiments, the WiFi interface supports multiple concurrent communications networks. In some embodiments a communications network includes a plurality of alternative channels which may be used, e.g., assigned, to different cameras, sensor, and/or controllable devices in the monitoring system at the customer premises. In some embodiments, the WiFi interface supports different alternative security levels.

In some embodiments, the BLE interface supports multiple communications bands. In some embodiments, the BLE interface supports multiple concurrent communications networks. In some embodiments a communications network includes a plurality of alternative channels which may be used, e.g., assigned, to different cameras, sensor, and/or controllable devices in the monitoring system at the customer premises. In some embodiments, the BLE interface supports different alternative security levels.

Figure 7:
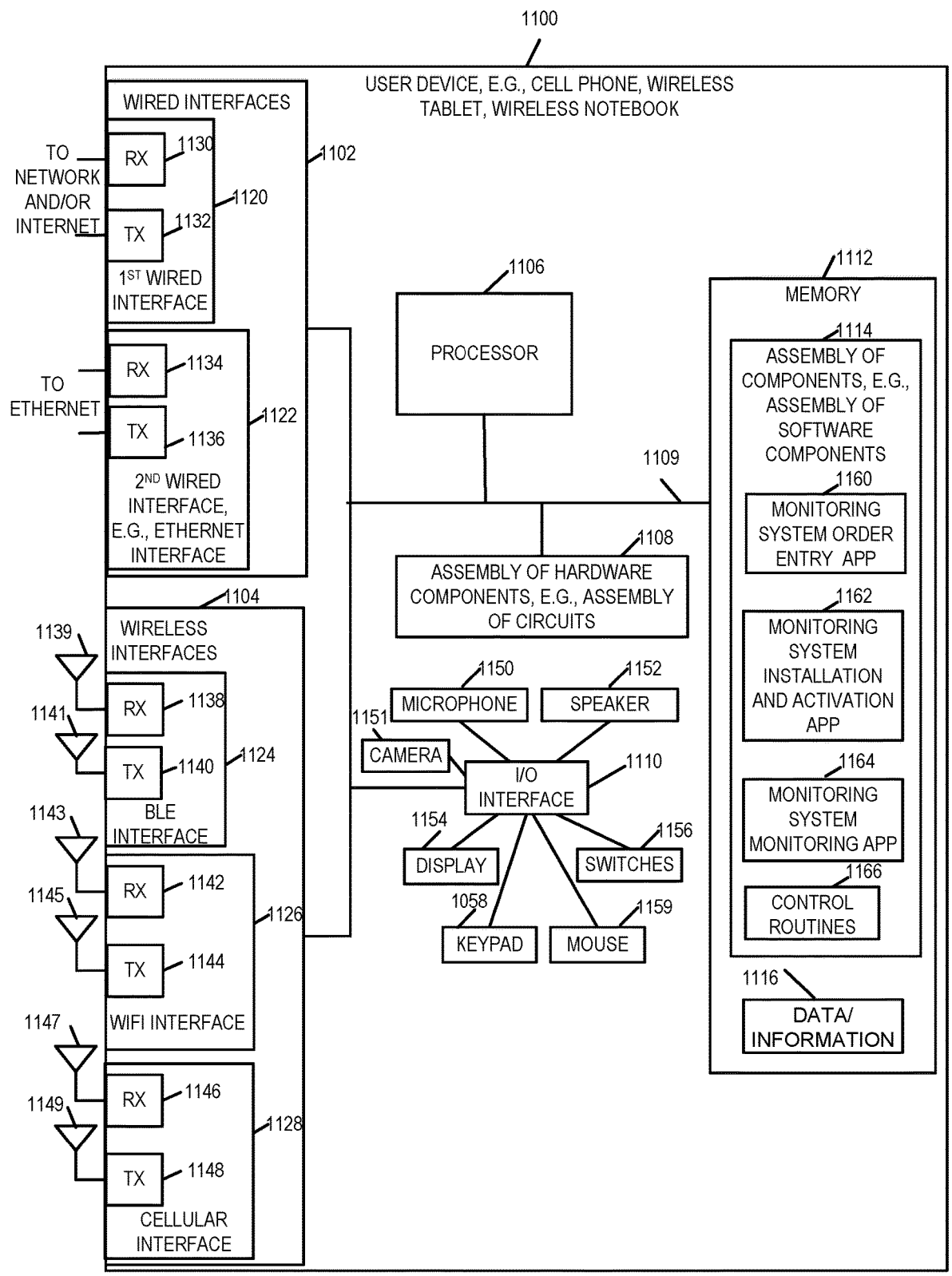
FIG. 7 is a drawing of an exemplary user device, e.g., a cell phone such as a smart phone, wireless tablet, wireless notebook, or laptop computer, in accordance with an exemplary embodiment.

FIG. 7 is a drawing of an exemplary user device 1100, e.g., a cell phone such as a smart phone, a wireless tablet, a wireless notebook, or a portable laptop computer, in accordance with an exemplary embodiment. Exemplary user device 1100 is, e.g., user device 128 of system 100 of FIG. 1. User device 1100 includes wired interfaces 1102, wireless interface 1104, a processor 1106, e.g., a CPU, an assembly of hardware components 1108, e.g., an assembly of circuits, an I/O interface 1110 and memory 1112 coupled together via a bus 1109 over which the various elements may interchange data and information. Wired interfaces 1102 includes a first wired interface 1118 including receiver 1038 and transmitter 1140 and a second wired interface 1120 including receiver 1142 and transmitter 1144. First wired interface 1118 can be, and sometimes is, coupled to a network and/or the Internet. Second wired interface 1120 can be, and sometimes is, coupled to an Ethernet, e.g., a local Ethernet being used at a customer premises site in which gateway 1000 is located.

Wireless interfaces 1104 includes a Bluetooth Low Energy (BLE) interface 1124, a WiFi interface 1126, and a cellular interface 1128. BLE interface 1124 includes a receiver 1138 coupled to receive antenna 1139 via which the user device 1100 can receive BLE signals, e.g., from gateway 124. BLE interface 1124 includes a transmitter 1140 coupled to transmitter antenna 1141 via which the user device 1100 can transmit BLE signals, e.g., to gateway 124. WiFi interface 1126 includes a receiver 1142 coupled to receive antenna 1143 via which the user device 1100 can receive WiFi signals, e.g., to gateway 124. WiFi interface 1126 includes a transmitter 1144 coupled to transmitter antenna 1145 via which the user device 1100 can transmit WiFi signals, e.g., to gateway 124. Cellular interface 1128 includes a receiver 1146 coupled to receive antenna 1147 via which the user device 1100 can receive downlink cellular signals, e.g., from cellular base station 125. Cellular interface 1128 includes a transmitter 1148 coupled to transmitter antenna 1149 via which the user device 1100 can transmit uplink cellular signals, e.g., to cellular base station 125. In some embodiments, the same antenna is used for one or more transmitters and/or receivers in user device 1100.

In some embodiments, the WiFi interface supports multiple communications bands. In some embodiments, the WiFi interface supports multiple concurrent communications networks. In some embodiments a communications network includes a plurality of alternative channels which may be used, e.g., assigned, to different cameras, sensor, and/or controllable devices in the monitoring system at the customer premises. In some embodiments, the WiFi interface supports different alternative security levels.

In some embodiments, the BLE interface supports multiple communications bands. In some embodiments, the BLE interface supports multiple concurrent communications networks. In some embodiments a communications network includes a plurality of alternative channels which may be used, e.g., assigned, to different cameras, sensor, and/or controllable devices in the monitoring system at the customer premises. In some embodiments, the BLE interface supports different alternative security levels.

I/O interface 1110 couples microphone 1150, speaker 1152, display 1154, switches 1156, keypad 1056 and mouse 1159 to bus 1109, via which the input and output devices may communicate with other elements in user device 1100. The input devices, e.g., microphone 1150, camera 1151, switchers 1156, keypad 1156 and display 1154, e.g., a touch screen display, and mouse 1159 receive input, e.g., questionably responses, an order, data, information, a selection, a indication a task in the installation is complete, etc., from a user, e.g., user 101 of system 100. The output devices, e.g., speaker 1152, switchers 1156, keypad 1156 and display 1154 output data and information, e.g., a questionnaire, an offer for a system, image of various alternative security systems devices, system layout plans, installation instructions and procedures, verification results, etc., to a user, e.g., user 101 of system 100.

In some embodiments, during at least part of the installation process of a surveillance camera, the surveillance camera video output feed is directed to the display 1154 of user device 1100, e.g., to assist in final mounting alignment.

In some embodiments, an image captured by camera 1151 is processed by the control system to determine if is a device, e.g., a sensor, e.g., a $CO_2$ sensor, smoke detector sensor, or fire sensor, had been mounted at a correct location, e.g., a correct height and/or correct distance from a potential fire source, e.g., in accordance with regulations or in accordance with the planned system design. In some such embodiments, the dimension of the device, e.g., sensor, are known and used as a reference by the control system in performing the mounting location determination.

Memory 1112 includes assembly of components 1114 and data/information 1116. Assembly of components 1114, e.g., an assembly of software components, includes a monitoring system order entry APP 1160, a monitoring system installation and activation APP 1162, a monitoring system monitoring APP 1164, and control routines 1166. Monitoring order system entry APP 1160 control the user device 1100 to perform operations included in the ordering of a home automation and security system for a customer premises, e.g., perform steps implemented by user device 128 shown and/or described with respect to FIG. 2. Monitoring system installation and activation APP 1162 controls the user device 1100 to perform operation included in the installation and activation of a home automation and security system, e.g., perform steps implemented by user device 128 shown and/or described with respect to FIG. 3. Monitoring system monitoring APP 1164 controls to user device 1100 to control and/or access monitoring functionality after a home automation and security system has been installed, e.g., check status, view a surveillance camera feed, activate and/or de-activate a security zone, reset an alarm, request an update, request to supplement the system, report a problem, etc.

Figure 8A:
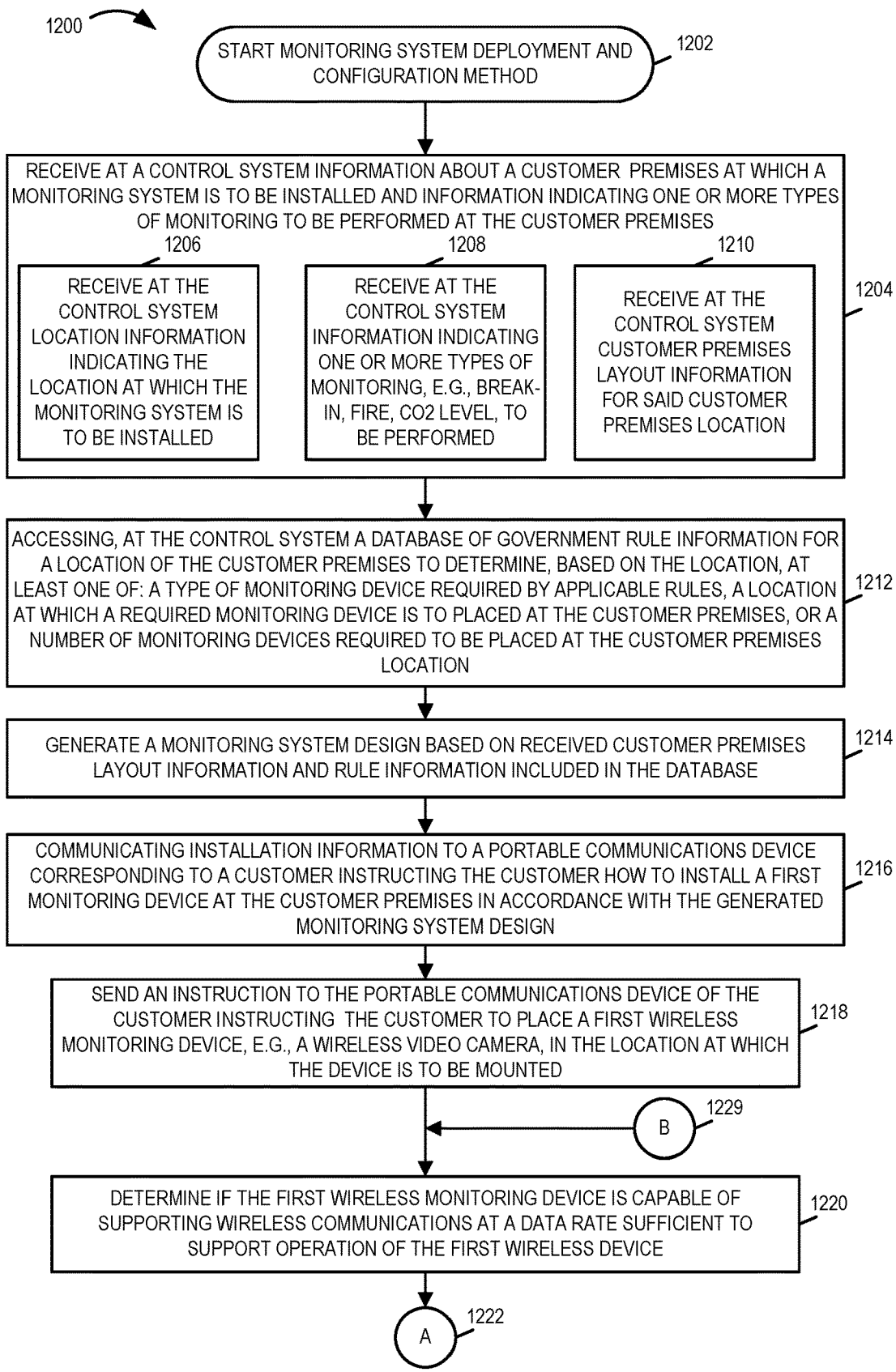
FIG. 8A is a first part of a flowchart of an exemplary method of performing a monitoring system deployment and configuration in accordance with an exemplary embodiment.
Figure 8B:
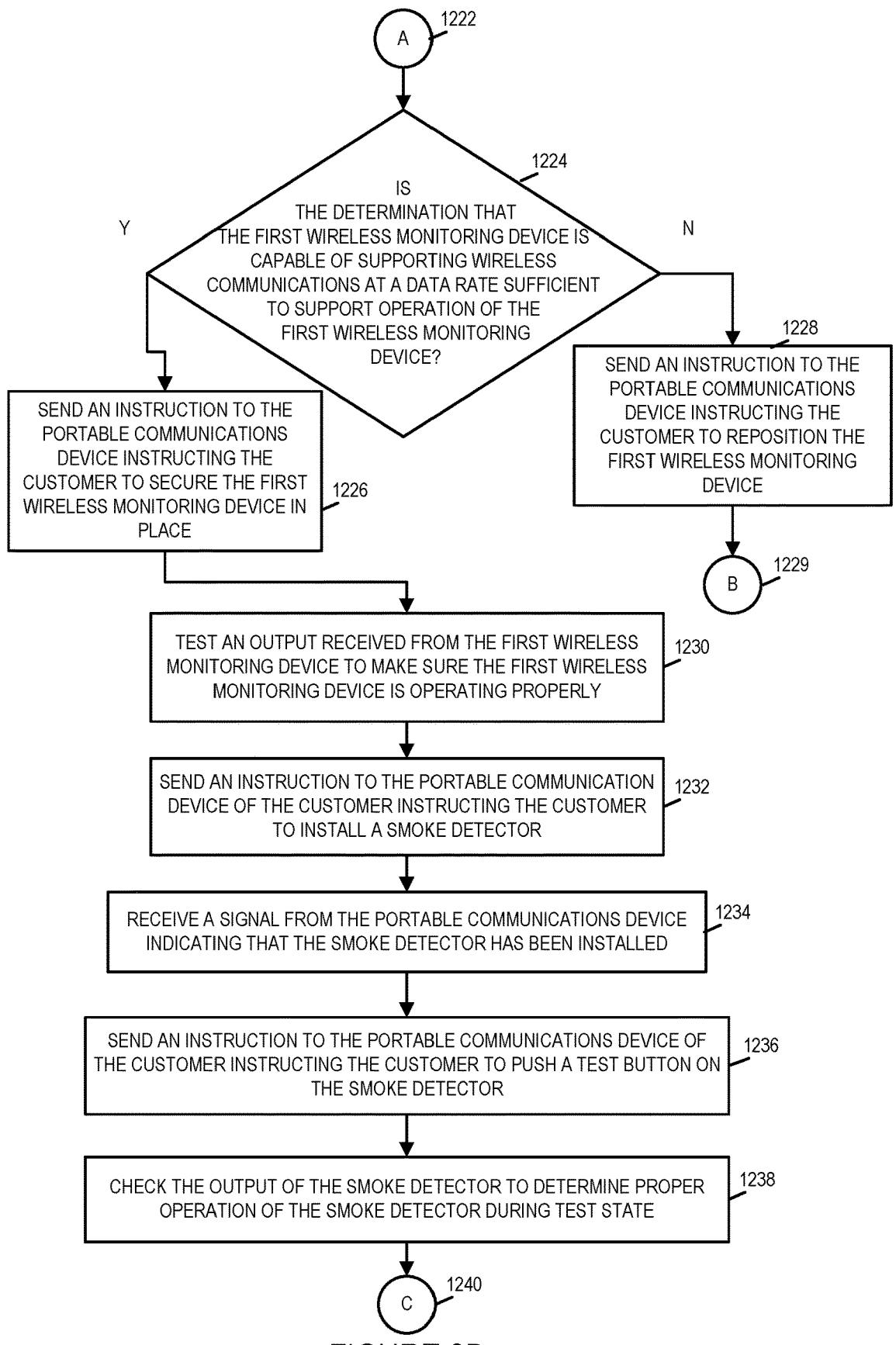
FIG. 8B is a second part of a flowchart of an exemplary method of performing a monitoring system deployment and configuration in accordance with an exemplary embodiment.

FIG. 8, comprising the combination of FIG. 8A, FIG. 8B and FIG. 8C, is a flowchart 1200 of an exemplary method of performing a monitoring system deployment and configuration in accordance with an exemplary embodiment. Operation starts in step 1202 and proceeds to step 1204. In step 1204, a control system, e.g., control system 112 of FIG. 1, receives information about a customer premises at which a monitoring system is to be installed and information indication one or more types of monitoring to be performed. Step 1204 includes steps 1206, 1208 and 1210. In step 1206 the control system receives location information indication the location at which the monitoring system is to be installed. In step 1208 the control system receives information indicating one or more types of monitoring, e.g., break-in monitoring, fire monitoring, smoke monitoring, CO2 level monitoring, to be performed. In step 1210 the control system receives customer premises layout information for the customer premises location. In some embodiments, the customer premises layout information includes rooms, doors, windows and other information allowing a floor plan layout to be generated for the customer premises location. In some embodiments, the customer premises layout information corresponds to multiple floors. In some embodiments, the customer premises layout information includes outside information, e.g., trees, shrubs, driveway, paths, fences, sidewalks, etc. In some embodiments, the customer premises layout information includes at least some property adjacent to the customer premises, e.g., portion of neighbor yard, streetlights, fire hydrant location, etc. Operation proceeds from step 1204 to step 1212.

In step 1212 the control system accesses a database of government rule information for a location of the customer premises to determine, based on the location at least one of: a type of monitoring device required by applicable rules, a location at which a required monitoring device is to be placed at the customer premises, or a number of monitoring devices required to be placed at the customer premises location.

In some embodiments, the accessed database is a database internal to the control system, e.g. database 118. In some embodiments, the accessed database is a database external to the control system, e.g. database 160. In some embodiments, the government rule information are local, state, and/or federal rules and/or codes. In some such embodiments, the applicable rules are applicable local, state, and/or federal rules and/or codes.

In some embodiments, in step the automated controller 114 in control system 112 consults the database 118 and the government rule information, e.g., building, fire and/or other safety code information, stored therein, to determine the types, numbers and installation locations of required monitoring devices for the customer premises, given the customer premises location and room/floor plan, to satisfy applicable government requirements and to generate a recommended list of monitoring devices along with recommended monitoring device placement information which will satisfy government requirements.

Operation proceeds from step 1212 to step 1214.

In step 1214 the control system generates a monitoring system design based on received customer premises layout information and rule information included in the database. In some embodiments, the generated monitoring system design is further based on user input, e.g. a customer interest for break-in monitoring, and the generated monitoring system design may suggest additional monitoring devices, e.g., surveillance cameras, door and/or window sensors, motion detectors, etc., which while not required by government regulation may be desirable to provide the user with a monitoring system satisfying the customer's monitoring objectives. In various embodiments, the monitoring system design includes a list of monitoring devices to be installed at the customer premises location and information indicating the locations at the customer premises where individual mounting devices are to be installed. Operation proceeds from step 1214 to step 1216.

In step 1216 the control system communicates installation information to a portable communications device corresponding to a customer instructing the customer how to install a first monitoring device at the customer premises in accordance with the generated monitoring system design. Operation proceeds from step 1216 to step 1218.

In step 1218 the control system sends an instruction to the portable communications device of the customer instructing the customer to place a first wireless monitoring device, e.g., a wireless video camera, in the location at which the first wireless monitoring device is to be mounted.

In some embodiments, the first monitoring device of step 1216 is a first wireless monitoring device and step 1218 is included as part of step 1216.

Operation proceeds from step 1218 to step 1220, in which the control system determines if the first wireless monitoring device is capable of supporting wireless communications at a data rate sufficient to support operation of the first wireless device. For example, check if first monitoring device is capable of communicating at the data rate needed to support video if the first wireless monitoring device is a video camera, e.g., is the quality of the current wireless communications channel between the video camera and the gateway good enough to support video.

Operation proceeds from step 1220, via connecting node A 1222, to step 1224. In step 1224, if the determination is that the first wireless monitoring device is capable of supporting wireless communications at a data rate sufficient to support operation of the first wireless device, then operation proceeds from step 1224 to step 1226, in which the control system sends an instruction to the portable communications device instructing the customer to secure the first wireless monitoring device in place. Operation proceeds from step 1226 to step 1230.

Returning to step 1224, in step 1224, if the determination is that the first wireless monitoring device is not capable of supporting wireless communications at a data rate sufficient to support operation of the first wireless device, then operation proceeds from step 1224 to step 1228, in which the control system sends an instruction to the portable communications device instructing the customer to reposition the first wireless monitoring device, e.g., tell the customer to move the first wireless monitoring device to a new location until wireless connectivity is adequate to support the required data rate. Operation proceeds from step 1228, via connecting node B 1229, to step 1220 for another determination if the first wireless monitoring device at its repositioned location is now capable of supporting wireless communications at a data rate sufficient to support operation of the first wireless device.

Returning to step 1230, in step 1230 the control system tests and output received from the first wireless monitoring device to make sure the first wireless monitoring device is operating properly. Operation proceeds from step 1230 to step 1232.

In step 1232 the control system sends an instruction to the portable communications device of the customer instructing the customer to install a smoke detector, e.g., with instructions for proper installation according to governing regulations and manufacture's guidelines. Operation proceeds from step 1232 to step 1234. In step 1234 the control system receives a signal from the portable communications device indicating that the smoke detector has been installed. Operation proceeds from step 1234 to step 1236.

In step 1236 the control system sends an instruction to the portable communications device of the customer instructing the customer to push a test button on the smoke detector. Operation proceeds from step 1234 to step 1236.

In step 1236 the control system sends an instruction to the portable communications device of the customer instructing the customer to push a test button on the smoke detector. Operation proceeds from step 1236 to step 1238.

In step 1238 the control system checks the output of the smoke detector to determine proper operation of the smoke detector during the test state. In some embodiments, the control system check includes receiving a signal from the portable communications device of the customer indicating that the customer is reporting that the smoke detector is outputting an audio and/or visual alarm. In some embodiments, the control system check includes receiving a signal or message sent from the smoke detector indicating the smoke detector is reporting proper operation. Operation proceeds from step 1238, via connecting node C 1240, to step 1242.

In step 1242 the control system sends an instruction to the portable communications device of the customer instructing the customer to install a door sensor, e.g., with instructions for proper installation according to governing regulations and manufacturer's guidelines. Operation proceeds from step 1242 to step 1244.

In step 1244 the control system receives a signal from the portable communications device indicating that the door sensor has been installed. Operation proceeds from the 1244 to step 1246. In step 1246 the control system sends an instruction to the portable communication device of the customer instructing the customer to open the door on which the door sensor has been installed. Operation proceeds from step 1246 to step 1248. In step 1248 the control system checks the output of the door sensor to determine proper operation of the door sensor when the door in the open state. Operation proceeds from step 1248 to step 1250. In step 1250 the control device sends an instruction to the portable communications device of the customer instructing the customer to close the door on which the door sensor has been installed. Operation proceeds from step 1250 to step 1252. In step 1252 the control system checks the output of the door sensor to determine proper operation of the door sensor when the door is in the closed position. Operation proceeds from step 1252 to step 1254.

In step 1254 the control system determines if there are additional devices, e.g., additional monitoring devices and/or additional controllable devices, to install. If the determination is that there are additional devices to install, then operation proceeds from step 1254 to step 1256; otherwise, operation proceeds from step 1254 to step 1264.

In step 1256 the control system sends an instruction to the portable device instructing the customer to install another device. Operation proceeds from step 1256 to step 1258 in which the control system receives a signal from the portable communications device indicating that said another device has been installed. Operation proceeds from step 1258 to step 1260. In step 1260 the control system sends a signal to test operation of the another device. Operation proceeds from step 1260 to step 1262. In step 1262 the control system receives a signal indicating that the another device is operating properly. Operation proceeds from step 1262 to the input of step 1254, in which the control system checks again if there are any additional devices left to install.

In one embodiment, the another device is a motion detector which controls power to a spotlight; the signal sent in step 1260 is an instruction to the portable communications device of the customer instructing the customer to move through the detection field of the motion detector; and the received signal of step 1262 is a signal from the portable communications device of the customer indicating that the motion detector has detected motion and has activated the spotlight.

In another embodiment, the another device is a light beam security fence device; the signal sent in step 1260 is an instruction to the portable communications device of the customer instructing the customer to traverse the light beam to trip the alarm; and the received signal of step 1262 is one of: i) a signal from the portable communications device of the customer indicating that the customer has detected an alarm has been set-off indicating proper operation or ii) a signal sent from the light beam security fence device indicating that the light beam path has been broken, indicating proper operation.

In another embodiment, the another device is a network connected controllable light; the signal sent in step 1260 is an instruction to the network connected controllable light to turn on the light; and the received signal of step 1262 is a signal from the portable communications device of the customer indicating that the light has been turned on.

In yet another embodiment, the another device is a network connected controllable thermostat; the signal sent in step 1260 is an instruction to change the current thermostat setting value; and the received signal of step 1262 is a signal from the portable communications device of the customer indicating that the customer has observed the thermostat setting value on the display change properly and/or observed a heating system and/or cooling system activation in response to the setting change as expected.

Retuning to step 1264, in step 1264 the control system confirms based on the output of installed monitoring devices that the monitoring devices installed at the customer premises are functioning properly. Operation proceeds from step 1264 to step 1266.

In step 1266 the home automation and security service system automatically switches from an installation mode of operation with regards to the customer premises location to a monitoring mode of operation in which a monitoring device, e.g., monitoring device 110, monitors the outputs of the monitoring devices for one or more conditions which if detected are to trigger an automatic alert.

Figure 9A:
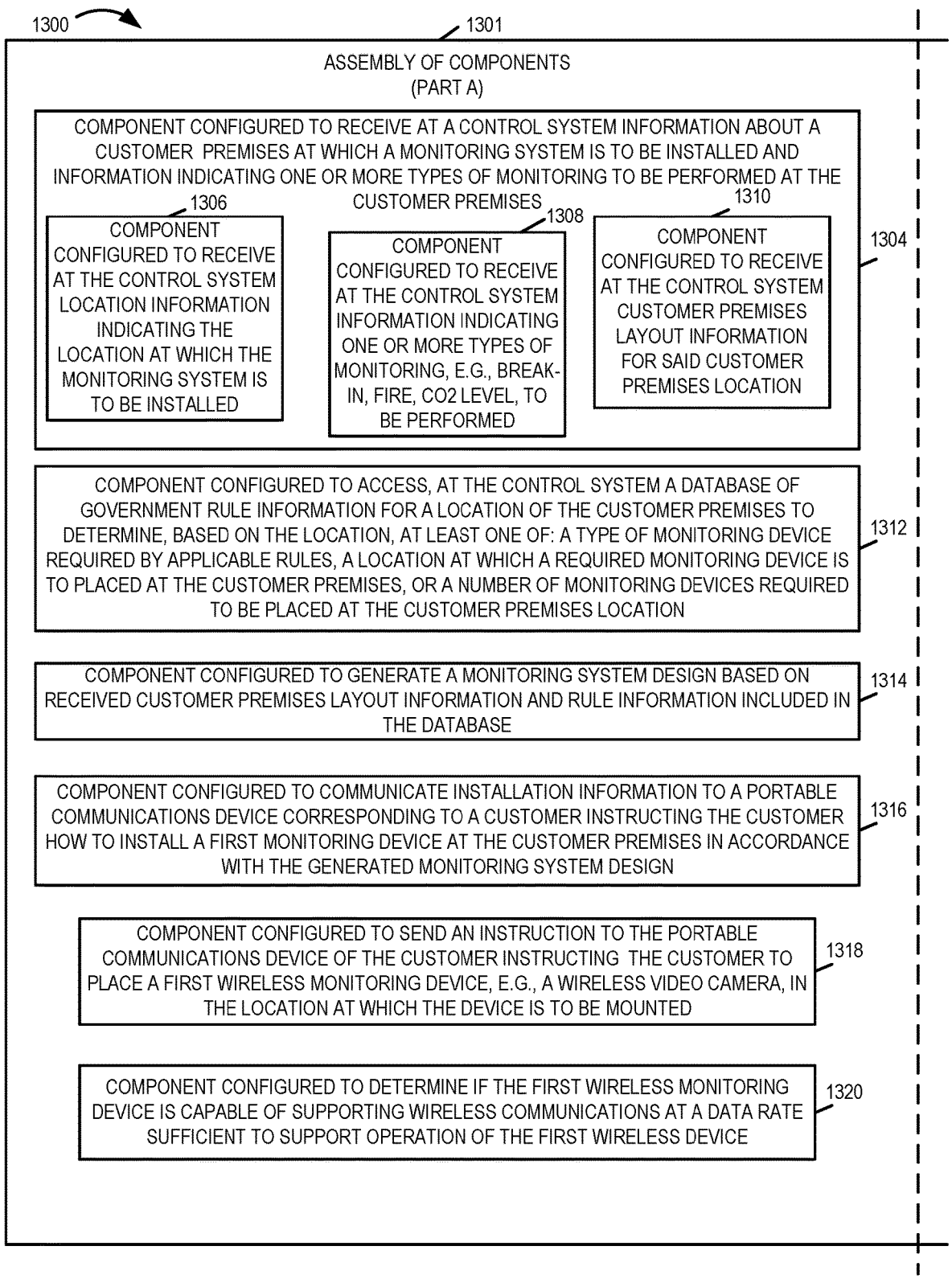
FIG. 9A is a first part of an exemplary assembly of components which may be included in an exemplary control system, e.g., a control server, in accordance with an exemplary embodiment.
Figure 9B:
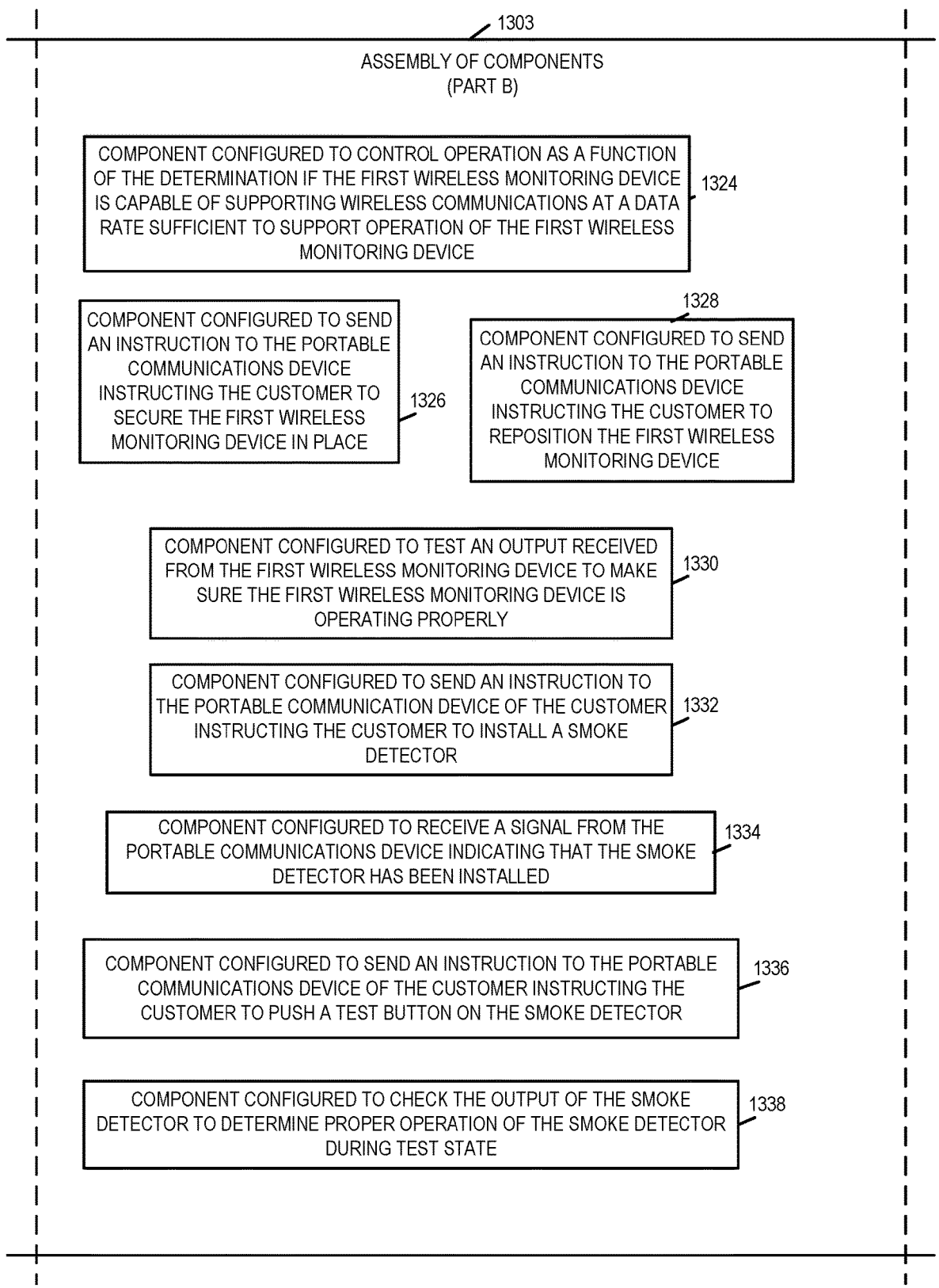
FIG. 9B is a second part of an exemplary assembly of components which may be included in an exemplary control system, e.g., a control server, in accordance with an exemplary embodiment.
Figures 9, 9C:
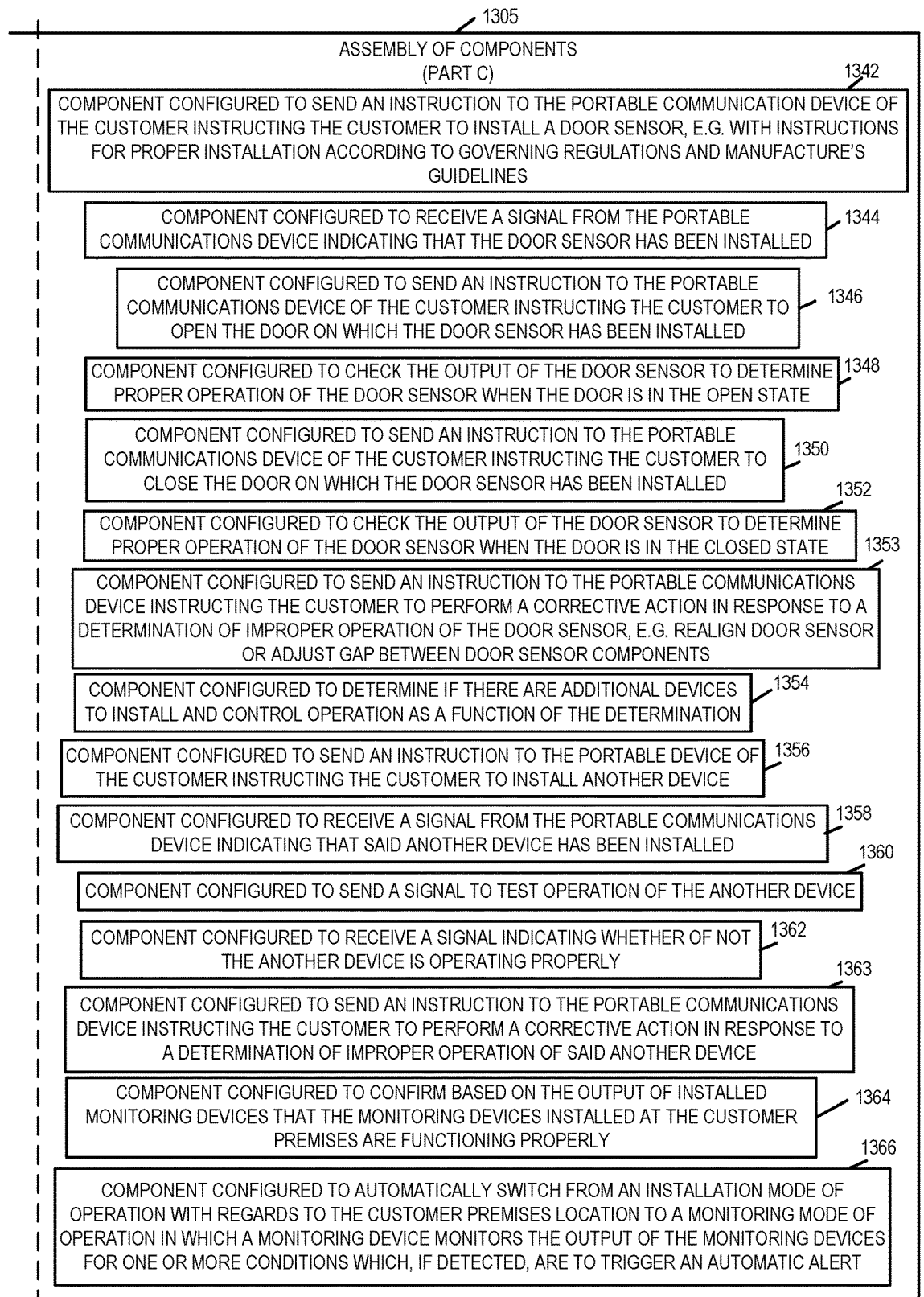
FIG. 9C is a third part of an exemplary assembly of components which may be included in an exemplary control system, e.g., a control server, in accordance with an exemplary embodiment.
FIG. 9 comprises the combination of FIG. 9A, FIG. 9B and FIG. 9C.

FIG. 9 is a drawing of an exemplary assembly of components 1300 which may be included in exemplary control system, e.g., control system 112, e.g., a control server, of Figure1 or FIG. 4, in accordance with an exemplary embodiment. The components in the assembly of components 1300 can, and in some embodiments are, implemented fully in hardware within the processor 802, e.g., as individual circuits. The components in the assembly of components 1300 can, and in some embodiments are, implemented fully in hardware within the assembly of hardware components 806, e.g., as individual circuits corresponding to the different components. In other embodiments some of the components are implemented, e.g., as circuits, within the processor 802 with other components being implemented, e.g., as circuits within assembly of components 806, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 804 of the control system 112, with the components controlling operation of system 112 to implement the functions corresponding to the components when the components are executed by a processor, e.g., processor 802. In some such embodiments, the assembly of components 1300 is included in the memory 804 as assembly of software components 814. In still other embodiments, various components in assembly of components 1300 are implemented as a combination of hardware and software, e.g., with another circuit external to the processor providing input to the processor 802 which then under software control operates to perform a portion of a component's function. While processor 802 is shown in the FIG. 4 embodiment as a single processor, e.g., computer, it should be appreciated that the processor 802 may be implemented as one or more processors, e.g., computers.

When implemented in software the components include code, which when executed by the processor 802, configure the processor 802 to implement the function corresponding to the component. In embodiments where the assembly of components 1300 is stored in the memory 804, the memory 804 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the control system 112 or elements therein such as the processor 802, to perform the functions of corresponding steps illustrated and/or described in the method of one or more of the flowcharts, signaling diagrams and/or described with respect to any of the Figures. Thus the assembly of components 1300 includes various components that perform functions of corresponding one or more described and/or illustrated steps of an exemplary method, e.g., one or more steps of the method of FIG. 2, FIG. 3, and/or FIG. 8.

One or more of the components in assembly of components 1300 may be implemented in its entirety or in part any of processors (802, 832, 852, 872), in any of assembly of hardware components (806, 836, 856, 876), or in any assembly of software components (814, 838, 858, 878).

FIG. 9, comprising the combination of FIG. 9A, FIG. 9B, and FIG. 9C, is a drawing of an exemplary assembly of components 1300, comprising the combination of Part A 1301, Part B 1303, and Part C 1305, which may be included in an exemplary control system, e.g., control system 112 of FIG. 1 and FIG. 4, in accordance with an exemplary embodiment. Assembly of components 1300 includes a component 1304 configured to received at a control system information about a customer premises at which a monitoring system is to be installed and information indicating one or more types of monitoring to be performed at the customer premises. Component 1304 includes a component 1306 configured to receive at the control system location information indicating the location at which the monitoring system is to be installed, a component 1308 configured to receive at the control system information indicating one or more types of monitoring, e.g., break-in, fire, smoke, and/or $CO_2$ level, to be performed, a component 1310 configured to receive at the control system customer premises layout information for said customer premises location. Assembly of components 1300 further includes a component 1312 configured to access at the control system a database of government rule information for a location of the customer premises to determine, based on the location, at least one of: a type of monitoring device required by applicable rules, a location at which a required monitoring device is to be placed at the customer premises, or a number of monitoring devices required to be placed at the customer premises location, a component 1314 configured to generate a monitoring system design based on received customer premises layout information and rule information included in the database.

Assembly of components 1300 further includes a component 1316 configured to communicate installation information to a portable communications device corresponding to a customer installation premises in accordance with the generated monitoring system design, a component 1318 configured to send an instruction to the portable communications device of the customer instructing the customer to place a first wireless monitoring device, e.g., a wireless video camera, in the location to which the device is to be mounted, a component 1320 configured to determine if the first wireless monitoring device is capable of supporting wireless communications at a data rate sufficient to support operation of the first wireless device, a component 1324 configured to control operation as a function of the determination if first wireless monitoring device is capable of supporting wireless communications at a data rate sufficient to support operation of the first wireless device, a component 1326 configured to send an instruction to the portable communications device instructing the customer to secure the first wireless monitoring device in place, when the determination is that the first wireless monitoring device is capable of supporting wireless communications at a data rate sufficient to support operation of the first wireless device, and a component 1328 configured to sends an instruction to the portable communications device instructing the customer to reposition the first wireless monitoring device, when the determination is that the first wireless monitoring device is not capable of supporting wireless communications at a data rate sufficient to support operation of the first wireless device. Assembly of components 1300 further includes a component 1330 configured to test an output received from the first wireless monitoring device to make sure that the first monitoring device is operating properly.

Assembly of components 1300 further includes a component 1332 configured to send an instruction to the portable communications device of the customer instructing the customer to install a smoke detector, a component 1334 configured to receive a signal from the portable communications device indicating that the smoke detector has been installed, a component 1336 configured to send an instruction to the portable communications device instructing the customer to push a test button on the smoke detector, and a component 1338 configured to check the output of the smoke detector to determine proper operation of the smoke detector during the test state.

Assembly of components 1300 further includes a component 1342 configured to send an instruction to the portable communications device of the customer instructing the customer to install a door sensor, e.g., with instructions for proper installation according to governing regulations and manufacture's guidelines, a component 1344 configured to receive a signal from the portable communications device indicating that the door sensor has been installed, a component 1346 configured to send an instruction to the portable communications device of the customer instructing the customer to open the door on which the door sensor has been installed, a component 1348 configured to check the output of the door sensor to determine proper output of the door sensor when the door is in the open state, a component 1350 configured to send an instruction to the portable communications device of the customer instructing the customer to close the door on which the door sensor has been installed, a component 1350 configured to send and instruction to the portable communications device of the customer instructing the customer to close the door on which the door sensor has been installed, a component 1352 configured to check the output of the door sensor to determine proper operation of the door sensor when the door is in a closed state, and a component 1353 configured to send an instruction to the portable communications device of the customer instructing the customer to perform a corrective action in response to a determination of improper operation of the door sensor, e.g., instruct the customer performing the installation to realign the door sensor, adjust the gap between components of the door sensor, replace the door sensor with another door sensor of the same type, or replace the door sensor with another door sensor having a different design. In some embodiments, in response to a determined unacceptable or failed component being installed, and in which there are no spare replacements at the customer premises, the control system automatically places an order for a replacement part to be sent to the customer premises, and/or adjusts the installation plan accordingly, e.g., allowing the installation to complete without the missing component, if it is not critical, and/or scheduling an installation update when the replacement component arrives at the customer premises.

Assembly of components 1300 further includes a component configured to determine if there are additional devices to install, e.g., based on the monitoring system design, and to control operation as a function of the determination, a component 1356 configured to send an instruction to the portable device of the customer instructing the customer to install another device, e.g., another door sensor, another security camera, a widow switch, a proximity sensor, a security light, an alarm, a light beam security fence, a CO2 sensor, a fire detector, etc., when the determination is that there is at least on one device to install, a component 1358 configured to receive a signal from the portable communications device indicating that said another device has been installed, a component 1360 configured to send a test signal to test operation of the another device, e.g., a test signal, e.g., a control signal to the another device, and/or a test instruction message to the portable communications device of the customer instructing the customer how to perform an operational test on the another device, and a component 1362 configured to receive a signal indicating whether or not the another device is operating properly, and a component 1363 configured to send an instruction to the portable communications device of the customer instructing the customer to perform a corrective action in response to a determination of improper operation of the another device. Assembly of components 1300 further includes a component 1364 configured to confirm based on the output of installed monitoring devices that the monitoring devices installed at the customer premises are functioning properly, e.g., when the determination of component 1354 is that there are not any additional devices to install, and a component 1366 configured to automatically switch from an installation mode of operation with regards to the customer premises location to a monitoring mode of operation in which a monitoring device monitors the output of the monitoring devices for one or more conditions which, if detected, are to trigger an automatic alert.

The invention relates a system and method for guided security system design and installation. The system operates as artificially intelligent expert system that helps consumers design a high quality security system specific to their premises. The system provides a user interface and prompts the consumer to answer questions about their premises, such as the number of floors, doors, windows, home occupants, pets, desired level of protection, etc. The system combines crime data of the consumer's neighborhood, the consumer's answers to the questions, and the codes, standards, and regulations for authorities having jurisdiction, into an expert security system design. The system design data is stored for further retrieval during installation. The system presents the design to the consumer allowing them to place the online order. The order is fulfilled and the security system equipment is delivered to the premises.

When the user seeks to proceed with installation of the monitoring system, components system retrieves the stored data and presents on the user interface detailed steps to guide the consumer through self-installation and verification of their security system. Using the installation codes, standards, and regulations for authorities having jurisdiction, the system presents the appropriate information to the consumer in an easy to follow format. Upon installation of a security device, the system performs automated verification through the back end systems and central monitoring station and guides the consumer on performing a walk through to test each device. With a visual representation of the installation progress and remaining steps, the consumer is guided through the installation as an experienced installer with all of the codes, standards, and manufacturer's specifications at their fingertips.

The methods and apparatus described herein differ from a simple security system visual floor plan layout tool because it adds a level of automation and interaction to the design, deployment of system components and testing of monitoring system components as part of the deployment process which is not available from a simple floor plan alarm system layout tool. Unlike a floor plan, the automated system of the invention can walk a consumer through a self-install process of a security system in an interactive manner with results often comparable or better than what they can expect if the system were installed by a professional installer.

In one exemplary embodiment, a monitoring system deployment and configuration method, includes: receiving at a control system (112) information about a customer premises at which a monitoring system is to be installed and information indicating one or more types of monitoring to be performed at the customer premises; accessing, at the control system (112), a database (118) (which is either internal to the control system or external thereto) of government rule (local code) information for a location of the customer premises to determine, based on the location, at least one of: a type of monitoring device required by applicable rules (local, state or federal rules/codes), a location at which a required monitoring device is to be placed at the customer premises, or a number of monitoring devices required to be placed at the customer premises location (the automated controller 114 in the control system 112 consults the database 118 and the government rule information, e.g., building, fire and other safety code information, stored therein to determine the types, number and locations of monitoring devices at the customer premises, given the customer premises location and room/floor plan, which are required to satisfy applicable government requirements and generates a recommend list of monitoring devices along with recommended placement information which will satisfy government requirements. and may suggest additional monitoring devices based on user input such as break-in monitoring which, while not required by government regulation maybe desirable to provide the user with a monitoring system satisfying the customer's monitoring objectives); generating a monitoring system design based on received customer premises layout information and rule information included in the database (In some embodiments, the generated monitoring system design is further based on user input, e.g. a customer interest for break-in monitoring, and the generated monitoring system design may suggest additional monitoring devices, e.g., surveillance cameras, door and/or window sensors, motion detectors, etc., which while not required by government regulation may be desirable to provide the user with a monitoring system satisfying the customer's monitoring objectives) ; and communicating installation information to a portable communications device corresponding to a customer instructing the customer how to install a first monitoring device at the customer premises in accordance with the generated monitoring system design.

Set forth below are various exemplary numbered embodiments. Each set of numbered exemplary embodiments is numbered by itself with embodiments in a set referring to previous numbered embodiments in the same set.

List of Set of Exemplary Numbered Method Embodiments

Method Embodiment 1 A monitoring system deployment and configuration method, the method comprising: receiving at a control system (112) information about a customer premises at which a monitoring system is to be installed and information indicating one or more types of monitoring to be performed at the customer premises; accessing, at the control system (112), a database (118) (which is either internal to the control system or external thereto) of government rule (local code) information for a location of the customer premises to determine, based on the location, at least one of: a type of monitoring device required by applicable rules (local, state or federal rules/codes), a location at which a required monitoring device is to be placed at the customer premises, or a number of monitoring devices required to be placed at the customer premises location (the automated controller 114 in the control system 112 consults the database 118 and the government rule information, e.g., building, fire and other safety code information, stored therein to determine the types, number and locations of monitoring devices at the customer premises, given the customer premises location and room/floor plan, which are required to satisfy applicable government requirements and generates a recommend list of monitoring devices along with recommended placement information which will satisfy government requirements. and may suggest additional monitoring devices based on user input such as break-in monitoring which, while not required by government regulation may be desirable to provide the user with a monitoring system satisfying the customer's monitoring objectives); generating a monitoring system design based on received customer premises layout information and rule information included in the database (In some embodiments, the generated monitoring system design is further based on user input, e.g. a customer interest for break-in monitoring, and the generated monitoring system design may suggest additional monitoring devices, e.g., surveillance cameras, door and/or window sensors, motion detectors, etc., which while not required by government regulation may be desirable to provide the user with a monitoring system satisfying the customer's monitoring objectives) ; and communicating installation information to a portable communications device (128) corresponding to a customer instructing the customer how to install a first monitoring device at the customer premises in accordance with the generated monitoring system design.

Method Embodiment 2 The method of method embodiment 1 wherein said step of receiving at the control system (112) information about the customer premises at which a monitoring system is to be installed and information indicating one or more types of monitoring to be performed at the customer premises includes: receiving, at a control system (112), location information indicating the location of the customer premises at which the monitoring system is to be installed; and receiving, at the control system (112), information indicating one or more types of monitoring (e.g., break-in, fire, smoke, CO2 level) to be performed.

Method Embodiment 3 The method of method embodiment 2, wherein said step of receiving at the control system (112) information about the customer premises at which a monitoring system is to be installed and information indicating one or more types of monitoring to be performed at the customer premises further includes: receiving, at the control system (112), customer premises layout information (e.g., rooms, doors, windows and other information allowing a floor plan layout to be generated for the customer premises location) for said customer premises location.

Method Embodiment 4 The method of method embodiment 3, wherein said monitoring system design includes a list of monitoring devices to be installed at the customer premises location and information indicating locations at the customer premises where individual monitoring devices are to be installed.

Method Embodiment 5 The method of method embodiment 4, wherein the monitoring system devices includes at least a first wireless monitoring device (e.g., a wireless video camera (132)) the method further comprising: sending an instruction to the portable communications device of the customer instructing the customer to place the first wireless monitoring device in the location at which the first wireless monitoring device is to be mounted; determining if the first wireless monitoring device is capable of supporting wireless communications at a data rate sufficient to support operation of the first wireless monitoring device;(e.g., check if the first wireless monitoring device is capable of communicating at the data rate needed to support video if the first wireless monitoring device is a video camera); when it is determined that the first wireless monitoring device is capable of supporting wireless communications at a data rate sufficient to support operation of the first wireless monitoring device sending an instruction to the portable communication device instructing the customer secure the first wireless monitoring device in place; and when it is determined that the first wireless monitoring device is not capable of supporting wireless communications at a data rate sufficient to support operation of the first wireless monitoring device sending an instruction to the portable communication device instructing the customer to reposition the first wireless monitoring device (e.g., tell the customer to move device to a new location until wireless connectivity is adequate to support the required data rate).

Method Embodiment 6 The method of method embodiment 5, further comprising: after the first wireless monitoring device is secured in place, testing an output received from the first wireless monitoring device to make sure the first wireless monitoring device is operating properly.

Method Embodiment 7 The method of method embodiment 5, wherein the monitoring system devices include at least a smoke detector (135) the method further comprising: sending an instruction to the portable communications device of the customer instructing the customer to install the smoke detector; receiving a signal form the portable communications device indicating the smoke detector has been installed; sending an instruction to the portable communications device of the customer instructing the customer to push a test button on the smoke detector; and checking the output of the smoke detector (135) to determine proper operation of the smoke detector when the smoke detector is in a test state.

Method Embodiment 8 The method of method embodiment 5, wherein the monitoring system devices includes at least a door sensor (130) the method further comprising: sending an instruction to the portable communications device of the customer instructing the customer to install the door sensor; receiving a signal from the portable communications device indicating the door sensor has been installed; sending an instruction to the portable communications device of the customer instructing the customer to open the door on which the door sensor has been installed; and checking the output of the door sensor to determine proper operation of the door sensor when the door is in the open state.

Method Embodiment 9 The method of method embodiment 8, further comprising sending an instruction to the portable communications device of the customer instructing the customer to close the door on which the door sensor has been installed; and checking the output of the door sensor to determine proper operation of the door sensor when the door is in the closed state.

Method Embodiment 10 The method of method embodiment, further comprising: confirming based on the output of installed monitoring devices that the monitoring devices installed at the customer premises are functioning properly; and automatically switching from an installation system mode of control system operation with regard to the customer premises location to a monitoring mode of operation where a monitoring device monitors the output of the monitoring devices for one or more conditions which, if detected, are to trigger an automatic alert.

List of Set of Exemplary Numbered System Embodiments

System Embodiment 1 A control system (112) for use in deployment of monitoring devices (130, 132, 134, 135, . . . , 139) at a customer premises location (106), the control system (112) comprising: memory (804, 834, 854, 874) including a database (881 of 118) of government rule information including rule information for a location of the customer premises, said rule information including information on a required location of a monitoring device or number of monitoring devices located at the customer premises; an interface (812) including a receiver (820) and a transmitter (822); and a processor (802) configured to control the control system (112) to perform the steps of: determining, based on the location of the customer premises, at least one of: a type of monitoring device required by applicable rules, a location at which a required monitoring device is to be placed at the customer premises, or a number of monitoring devices required to be placed at the customer premises location; receiving information about a customer premises at which a monitoring system is to be installed and information indicating one or more types of monitoring to be performed at the customer premises; generating a monitoring system design based on received customer premises layout information and rule information included in the database; and communicating installation information to a portable communications device (128) corresponding to a customer instructing the customer how to install a first monitoring device at the customer premises in accordance with the generated monitoring system design.

System Embodiment 2 The control system (112) of system embodiment 1, wherein receiving at the control system (112) information about the customer premises at which a monitoring system is to be installed and information indicating one or more types of monitoring to be performed at the customer premises includes:
receiving location information indicating the location of the customer premises at which the monitoring system is to be installed; and receiving information indicating one or more types of monitoring (e.g., break-in, fire, smoke, $CO_2$ level) to be performed.

System Embodiment 3 The control system (112) of system embodiment 2, wherein the processor is configured to control the control system to receive at the control system (112), customer premises layout information (e.g., rooms, doors, windows and other information allowing a floor plan layout to be generated for the customer premises location) for said customer premises location as part of receiving information about the customer premises at which a monitoring system is to be installed.

System Embodiment 4 The control system (112) of system embodiment 3, wherein said monitoring system design includes a list of monitoring devices to be installed at the customer premises location and information indicating locations at the customer premises where individual monitoring devices are to be installed.

System Embodiment 5 The control system (112) of system embodiment 4, wherein the monitoring system devices includes at least a first wireless monitoring device (e.g., a wireless video camera (132)) and wherein the processor is further configured to control the control system to: send an instruction to the portable communications device of the customer instructing the customer to place the first wireless monitoring device in the location at which the first wireless monitoring device is to be mounted; determine if the first wireless monitoring device is capable of supporting wireless communications at a data rate sufficient to support operation of the first wireless monitoring device;(e.g., check if the first wireless monitoring device is capable of communicating at the data rate needed to support video if the first wireless monitoring device is a video camera); and send, when it is determined that the first wireless monitoring device is capable of supporting wireless communications at a data rate sufficient to support operation of the first wireless monitoring device, an instruction to the portable communication device instructing the customer secure the first wireless monitoring device in place; and send, when it is determined that the first wireless monitoring device is not capable of supporting wireless communications at a data rate sufficient to support operation of the first wireless monitoring device, an instruction to the portable communication device instructing the customer to reposition the first wireless monitoring device (e.g., tell the customer to move device to a new location until wireless connectivity is adequate to support the required data rate).

System Embodiment 6 The control system (112) of system embodiment 5, wherein the processor is further configured to control the control system to: test an output received from the first wireless monitoring device to make sure the first wireless monitoring device is operating properly after the first wireless monitoring device is secured in place.

System Embodiment 7 The control system (112) of system embodiment 5, wherein the monitoring system devices include at least a smoke detector (135) and wherein the processor is further configured to control the control system to: send an instruction to the portable communications device of the customer instructing the customer to install the smoke detector; receive a signal from the portable communications device indicating the smoke detector has been installed; send an instruction to the portable communications device of the customer instructing the customer to push a test button on the smoke detector; and check the output of the smoke detector (135) to determine proper operation of the smoke detector when the smoke detector is in a test state.

System Embodiment 8 The control system (112) of system embodiment 5, wherein the monitoring system devices includes at least a door sensor (130) the processor of the control system being further configured to control the control system to: send an instruction to the portable communications device of the customer instructing the customer to install the door sensor; receive a signal from the portable communications device indicating the door sensor has been installed; send an instruction to the portable communications device of the customer instructing the customer to open the door on which the door sensor has been installed; and check the output of the door switch to determine proper operation of the door switch when the door is in the open state.

List of Set of Exemplary Numbered Computer Readable Medium Embodiments

Computer Readable Medium Embodiment 1 A non-transitory computer readable medium (804) including computer executable instructions which when executed by a processor (802) of a control system (112) cause the control system (112) to perform the steps of: receiving at a control system (112) information about a customer premises at which a monitoring system is to be installed and information indicating one or more types of monitoring to be performed at the customer premises; accessing, at the control system (112), a database (118) of government rule information for a location of the customer premises to determine, based on the location, at least one of: a type of monitoring device required by applicable rules, a location at which a required monitoring device is to be placed at the customer premises, or a number of monitoring devices required to be placed at the customer premises location; generating a monitoring system design based on received customer premises layout information and rule information included in the database; and communicating installation information to a portable communications device (128) corresponding to a customer instructing the customer how to install a first monitoring device at the customer premises in accordance with the generated monitoring system design.

Computer Readable medium Embodiment 2 The non-transitory computer readable medium of computer readable medium embodiment 1 wherein computer readable medium includes computer executable instructions which when executed control the control system to perform, as part of receiving information about the customer premises, the steps of: receiving location information indicating the location of the customer premises at which the monitoring system is to be installed; and receiving information indicating one or more types of monitoring (e.g., break-in, fire, smoke, $CO_2$ level) to be performed.

The techniques of various embodiments may be implemented using software, hardware and/or a combination of software and hardware. Various embodiments are directed to apparatus, e.g., user devices, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components maybe implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A monitoring system deployment and configuration method, the method comprising:
receiving, at a control system, information about a customer premises at which a monitoring system is to be installed, said control system being located external to said customer premises;
communicating installation information from said control system to a portable communications device corresponding to a customer, said installation information instructing the customer how to install a first wireless monitoring device at the customer premises in accordance with a monitoring system design;
sending an instruction from said control system to the portable communications device of the customer, said instruction instructing the customer to place the first wireless monitoring device in a location at which the first wireless monitoring device is to be mounted; and
determining, at said control system, if the first wireless monitoring device is capable of supporting wireless communications at a data rate sufficient to support operation of the first wireless monitoring device.

2. The method of claim 1, further comprising:
generating, at said control system, said monitoring system design based on received customer premises layout information.

3. The method of claim 2, further comprising:
performing one of:
i) sending an instruction from the control system to the portable communication device instructing the customer to secure the first wireless monitoring device in place in response to determining that the first wireless monitoring device is capable of supporting wireless communications at a data rate sufficient to support operation of the first wireless monitoring device; or
ii) sending an instruction from the control system to the portable communication device instructing the customer to reposition the first wireless monitoring device in response to determining that the first wireless monitoring device is not capable of supporting wireless communications at a data rate sufficient to support operation of the first wireless monitoring device.

4. The method of claim 3, further comprising:
operating a wireless gateway at the customer premises to scan for wireless networks;
operating the wireless gateway to indicate to the first wireless monitoring device which wireless network SSID and frequency to use; and
operating the wireless gateway to communicate signal strength and signal to noise ratio (SNR) information corresponding to the first wireless monitoring device to the control system.

5. The method of claim 4, further comprising:
operating the wireless gateway to manage use of radio resources at the customer premises by operating the wireless gateway to move between different RF frequencies.

6. The method of claim 5, wherein said monitoring system design includes a list of monitoring devices to be installed at the customer premises location and information indicating locations at the customer premises where individual monitoring devices are to be installed.

7. The method of claim 1, further comprising:
receiving, at the control system, from a wireless gateway at the first customer premises which receives a wireless signal from the first wireless monitoring device, both: i) signal strength and ii) signal to noise ratio (SNR) information corresponding to said first wireless monitoring device, said signal strength and SNR information being received at said control system prior to the control system determining if the first wireless monitoring device is capable of supporting wireless communications at a data rate sufficient to support operation of the first wireless monitoring device.

8. The method of claim 7, further comprising:
after the first wireless monitoring device is secured in place, testing, at the control system, an output received from the first wireless monitoring device to make sure the first wireless monitoring device is operating properly.

9. The method of claim 7, wherein monitoring devices of the monitoring system include at least a smoke detector, the method further comprising:
- sending an instruction, from the control system, to the portable communications device of the customer instructing the customer to install the smoke detector;
- receiving a signal from the portable communications device indicating the smoke detector has been installed;
- sending an instruction to the portable communications device of the customer instructing the customer to push a test button on the smoke detector; and
- checking the output of the smoke detector to determine proper operation of the smoke detector when the smoke detector is in a test state.

10. The method of claim 7, wherein monitoring devices of the monitoring system includes at least a door sensor, the method further comprising:
- sending an instruction to the portable communications device of the customer instructing the customer to install the door sensor;
- receiving a signal from the portable communications device indicating the door sensor has been installed;
- sending an instruction to the portable communications device of the customer instructing the customer to open the door on which the door sensor has been installed; and
- checking the output of the door sensor to determine proper operation of the door sensor when the door is in the open state.

11. A control system for use in deployment of monitoring devices at a customer premises location, the control system comprising:
- memory including a database of government rule information including rule information for a location of the customer premises, said rule information including information on a required location of a monitoring device or number of monitoring devices located at the customer premises;
- an interface including a receiver and a transmitter; and
- a processor configured to control the control system to perform the steps of:
  - receiving, at the control system, information about a customer premises at which a monitoring system is to be installed, said control system being located external to said customer premises;
  - communicating installation information from said control system to a portable communications device corresponding to a customer, said installation information instructing the customer how to install a first wireless monitoring device at the customer premises in accordance with a monitoring system design;
  - sending an instruction from said control system to the portable communications device of the customer, said instruction instructing the customer to place the first wireless monitoring device in a location at which the first wireless monitoring device is to be mounted; and
  - determining, at said control system, if the first wireless monitoring device is capable of supporting wireless communications at a data rate sufficient to support operation of the first wireless monitoring device.

12. The control system of claim 11, wherein said processor is configured to control the control system to:
- generate said monitoring system design based on received customer premises layout information.

13. The control system of claim 12, wherein said processor is configured to control the control system to perform one of:
  i) sending an instruction from the control system to the portable communication device instructing the customer to secure the first wireless monitoring device in place in response to determining that the first wireless monitoring device is capable of supporting wireless communications at a data rate sufficient to support operation of the first wireless monitoring device; or
  ii) sending an instruction from the control system to the portable communication device instructing the customer to reposition the first wireless monitoring device in response to determining that the first wireless monitoring device is not capable of supporting wireless communications at a data rate sufficient to support operation of the first wireless monitoring device.

14. The control system of claim 13, wherein said monitoring system design includes a list of monitoring devices to be installed at the customer premises location and information indicating locations at the customer premises where individual monitoring devices are to be installed.

15. The control system of claim 11, wherein the processor is further configured to control the control system to:
- receive, at the control system, from a wireless gateway at the customer premises which receives a wireless signal from the first wireless monitoring device, both: i) signal strength and ii) signal to noise ratio (SNR) information corresponding to said first wireless monitoring device, said signal strength and SNR information being received at said control system prior to the control system determining if the first wireless monitoring device is capable of supporting wireless communications at a data rate sufficient to support operation of the first wireless monitoring device.

16. The control system of claim15, wherein the processor is further configured to control the control system to:
- test an output received from the first wireless monitoring device to make sure the first wireless monitoring device is operating properly after the first wireless monitoring device is secured in place.

17. The control system of claim 15, wherein monitoring devices of the monitoring system include at least a smoke detector and wherein the processor is further configured to control the control system to:
- send an instruction to the portable communications device of the customer instructing the customer to install the smoke detector;
- receive a signal from the portable communications device indicating the smoke detector has been installed;
- send an instruction to the portable communications device of the customer instructing the customer to push a test button on the smoke detector; and
- check the output of the smoke detector to determine proper operation of the smoke detector when the smoke detector is in a test state.

18. The control system of claim 15, wherein monitoring devices of the monitoring system include at least a door sensor, the processor of the control system being further configured to control the control system to:
- send an instruction to the portable communications device of the customer instructing the customer to install the door sensor;
- receive a signal from the portable communications device indicating the door sensor has been installed;

send an instruction to the portable communications device of the customer instructing the customer to open the door on which the door sensor has been installed; and check the output of the door sensor to determine proper operation of the door sensor when the door is in the open state.

19. A non-transitory computer readable medium including computer executable instructions which when executed by a processor of a control system cause the control system to perform the steps of:

receiving, at the control system, information about a customer premises at which a monitoring system is to be installed, said control system being located external to said customer premises;

communicating installation information, from said control system to a portable communications device corresponding to a customer, said installation information instructing the customer how to install a first wireless monitoring device at the customer premises in accordance with a monitoring system design;

sending an instruction from said control system to the portable communications device of the customer, said instruction instructing the customer to place the first wireless monitoring device in a location at which the first wireless monitoring device is to be mounted; and determining, at said control system, if the first wireless monitoring device is capable of supporting wireless communications at a data rate sufficient to support operation of the first wireless monitoring device.

20. The non-transitory computer readable medium of claim 19, wherein the computer readable medium includes computer executable instructions which when executed control the control system to perform, as part of receiving information about the customer premises, the steps of:

receiving location information indicating the location of the customer premises at which the monitoring system is to be installed; and receiving information indicating one or more types of monitoring to be performed.

* * * * *